(12) United States Patent
Ito et al.

(10) Patent No.: US 11,036,159 B2
(45) Date of Patent: Jun. 15, 2021

(54) IMAGE FORMING APPARATUS FOR CONTROLLING AN EXPOSURE AMOUNT ON A SURFACE OF A PHOTOCONDUCTOR

(71) Applicant: CANON KABUSHIKI KAISHA, Tokyo (JP)

(72) Inventors: Shingo Ito, Tokyo (JP); Masashi Tanaka, Kawasaki (JP); Kohei Okayasu, Mishima (JP); Kenichi Iida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/687,551

(22) Filed: Nov. 18, 2019

(65) Prior Publication Data
US 2020/0174394 A1 Jun. 4, 2020

(30) Foreign Application Priority Data
Nov. 29, 2018 (JP) .............................. JP2018-224162

(51) Int. Cl.
*G03G 15/04* (2006.01)
*G06K 15/00* (2006.01)
(Continued)

(52) U.S. Cl.
CPC ............. *G03G 15/043* (2013.01); *G03G 5/02* (2013.01); *G03G 15/751* (2013.01); *G06K 15/1209* (2013.01); *G03G 2215/00962* (2013.01)

(58) Field of Classification Search
CPC ................. G03G 5/043; G03G 15/043; G03G 15/04072; G03G 15/5033; G03G 15/75;
(Continued)

(56) References Cited

U.S. PATENT DOCUMENTS

| 7,642,025 B2 * | 1/2010 | Tada | ...................... G03G 17/04 430/133 |
| 9,046,809 B2 * | 6/2015 | Watanabe | ............ G03G 15/043 |

(Continued)

FOREIGN PATENT DOCUMENTS

| JP | 58-125064 A | 7/1983 | |
| JP | 61151665 A * | 7/1986 | ............. G03G 15/75 |

(Continued)

*Primary Examiner* — Robert B Beatty
(74) *Attorney, Agent, or Firm* — Canon U.S.A., Inc. IP Division

(57) ABSTRACT

An image forming apparatus includes a photoconductor including a charge generation layer; a charging member to charge a surface of the photoconductor; and an exposure unit to expose the surface of the photoconductor to form a toner image on the surface of the photoconductor charged. The exposure unit exposes the surface of the photoconductor by scanning a laser beam in a main scanning direction at a non-constant scan rate, and exposure amount per unit length of the surface of the photoconductor in the main scanning direction is larger in a first region than in a second region. The first region is in the surface of the photoconductor exposed at a first scan rate. The second region is in the surface of the photoconductor exposed at a second scan rate higher than the first scan rate. The charge generation layer is thinner in the first region than in the second region.

18 Claims, 11 Drawing Sheets

(51) Int. Cl.
*G03G 15/043* (2006.01)
*G03G 5/02* (2006.01)
*G03G 15/00* (2006.01)
*G06K 15/12* (2006.01)

(58) Field of Classification Search
CPC ....... G03G 15/751; G03G 2215/00071; G03G 2215/00957; G03G 2215/00962; G03G 2215/0404; G06K 15/1209
USPC ................................ 399/4, 51, 159; 347/253
See application file for complete search history.

(56) References Cited

U.S. PATENT DOCUMENTS

| | | | |
|---|---|---|---|
| 10,025,221 B2* | 7/2018 | Iida | H04N 1/4056 |
| 2010/0183331 A1* | 7/2010 | Ishii | G03G 5/08 |
| | | | 399/159 |
| 2012/0300009 A1* | 11/2012 | Toyoizumi | G03G 15/5033 |
| | | | 347/118 |
| 2016/0246210 A1* | 8/2016 | Fujii | G03G 15/043 |

FOREIGN PATENT DOCUMENTS

| | | | | |
|---|---|---|---|---|
| JP | 1-232354 | A | | 9/1989 |
| JP | 4-130433 | A | | 5/1992 |
| JP | 04130433 | A | * | 5/1992 |
| JP | 2006-181883 | A | | 7/2006 |
| JP | 2013-238803 | A | | 11/2013 |
| JP | 2016-000510 | A | | 1/2016 |
| JP | 2017-209965 | A | | 11/2017 |
| JP | 2018-103484 | A | | 7/2018 |

* cited by examiner

IMAGE FORMING APPARATUS FOR CONTROLLING AN EXPOSURE AMOUNT ON A SURFACE OF A PHOTOCONDUCTOR

BACKGROUND OF THE DISCLOSURE

Field of the Disclosure

The present disclosure relates to an electrophotographic image forming apparatus such as a laser beam printer, a digital copier, or a digital facsimile (FAX).

Description of the Related Art

An electrophotographic image forming apparatus has an optical scanning unit for exposing a photoconductor. The optical scanning unit emits a light beam on the basis of image data. The emitted light beam is reflected from a rotational polygon mirror to pass through a scanning lens, and then scans and exposes the photoconductor. As the scanning lens, a lens is often used which has so-called fθ characteristics. The fθ characteristics herein are optical characteristics that a light beam is focused on a surface of the photoconductor to form an image in such a manner that a spot of the light beam moves at constant speed on the surface of the photoconductor in response to the rotational polygon mirror rotated at constant angular velocity. However, the scanning lens having fθ characteristics is large in size, which increases the size of the image forming apparatus. Accordingly, in order to reduce the size and cost of the image forming apparatus, no scanning lens is used, or, alternatively, a scanning lens without fθ characteristics is used. Japanese Patent Laid-Open No. 58-125064 discloses a configuration in which a clock frequency is so changed that, even when a spot of light beam does not move at constant speed on a surface of a photoconductor, a pixel width, which is a gap between respective centers of latent image dots formed on the photoconductor, is constant.

However, where the spot of light beam does not move at constant speed on the surface of the photoconductor, exposure amount per unit area of the photoconductor changes due to variation in scan rate. The difference in exposure amount sometimes makes an image uneven in the main scanning direction of the photoconductor.

SUMMARY OF THE DISCLOSURE

According to an aspect of the disclosure, an image forming apparatus includes a photoconductor including a charge generation layer; a charging member configured to charge a surface of the photoconductor; and an exposure unit configured to expose the surface of the photoconductor to form a toner image on the surface of the photoconductor charged by the charging member. The exposure unit exposes the surface of the photoconductor by scanning a laser beam in a main scanning direction at a non-constant scan rate, and exposure amount per unit length of the surface of the photoconductor in the main scanning direction is larger in a first region than in a second region, the first region being a region in the surface of the photoconductor exposed at a first scan rate, the second region being a region in the surface of the photoconductor exposed at a second scan rate higher than the first scan rate, and a thickness of the charge generation layer is smaller in the first region than in the second region.

Further features of the disclosure will become apparent from the following description of exemplary embodiments (with reference to the attached drawings).

DESCRIPTION OF THE EMBODIMENTS

Figure 1:
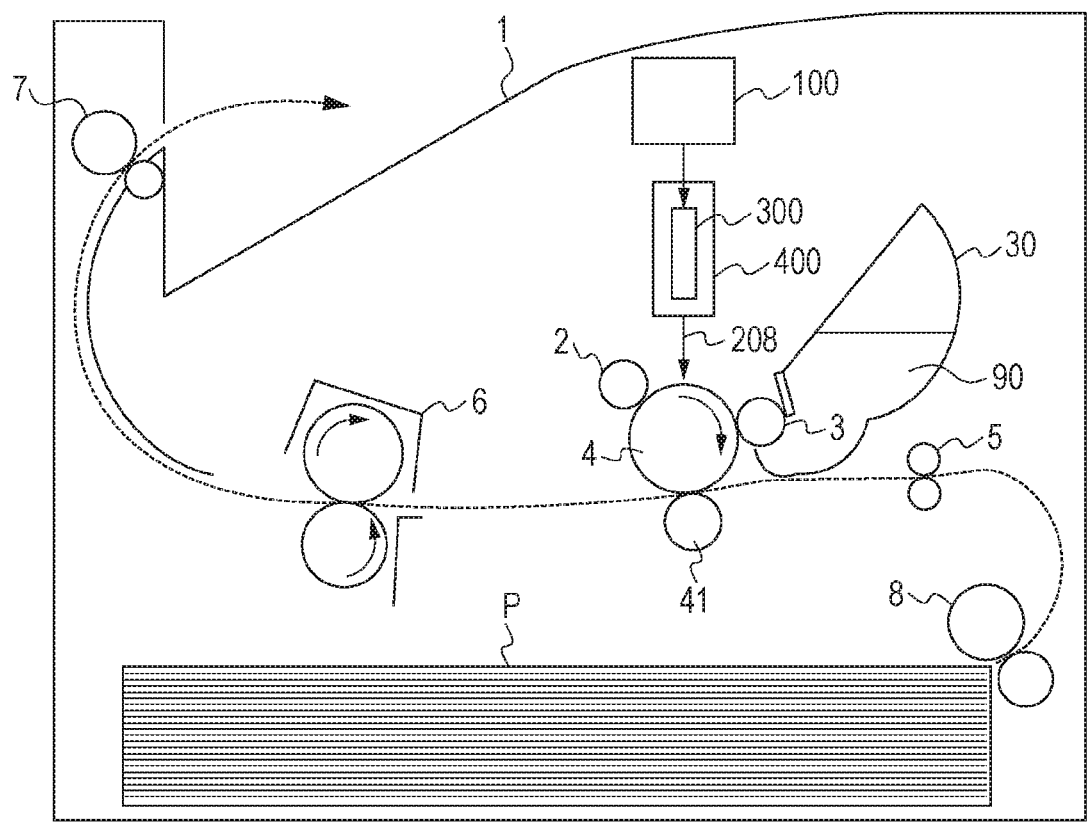
FIG. 1 is a diagram showing the structure of an image forming apparatus according to example 1.

Hereinafter, illustrative embodiments of the present disclosure are described with reference to drawings. The embodiments described below are illustrated examples, and the present disclosure is not limited to the illustrated examples. In the drawings, constituent elements that are not necessary to describe the embodiments are omitted from the drawings.

Example 1

1. Image Forming Apparatus

FIG. 1 is a schematic diagram of the structure of an image forming apparatus 1 according to this example. The image forming apparatus 1 is an A4 monochrome laser beam printer. A laser drive portion 300 of an exposure unit 400 serving as an optical scanning unit that is an exposure unit emits a light beam 208 on the basis of image data outputted from an image signal generation portion 100. The light beam 208 scans and exposes a surface of a photoconductor drum 4 charged by a charging roller 2 that is a charging member, and a latent image is formed on the surface of the photoconductor drum 4. A development roller 3 serving as a developing member develops the latent image with toner to form a toner image. A conveyor roller 5 conveys a recording medium P supplied from a sheet feeding unit 8 to a transfer part that is a nip area between the photoconductor drum 4 and a transfer roller 41. The transfer roller 41 transfers the toner image formed on the photoconductor drum 4 onto the recording medium P. A non-illustrated cleaning member cleans so-called residual toner which remains on the photoconductor drum 4 without being transferred, and the surface of the photoconductor drum 4 is provided for the successive image formation. On the other hand, a fixing unit 6 applies heat and pressure onto the recording medium P, so that the post-transfer toner image is fixed on the recording medium P. A discharge roller 7 discharges the recording medium P on which the toner image has been fixed to outside of the image forming apparatus 1.

The photoconductor drum 4 is a cylindrical rotatable photoconductor drum that is an image bearing member. The photoconductor drum 4 rotates around an axis thereof. The surface of a photoconductor drum 4 is evenly charged with dark-area potential Vd by the charging roller 2 that is a contact charging device. After that, an exposure unit 400 exposes the surface of the photoconductor drum 4 to form light-area potential V1, so that a latent image is formed.

The charging roller 2 has a metal core and a conductive elastic layer that is concentrically and integrally formed around the metal core. A non-illustrated charging voltage power supply that is a charging voltage application unit applies charging voltage to the metal core. Direct current (DC) voltage including Vd+Vth is applied to the charging roller 2 and the photoconductor drum 4 is evenly charged through discharge with charging potential Vd. Discharge start voltage is denoted by Vth. Where charging voltage to be applied is small, the surface potential of the photoconductor drum 4 does not increase through discharge; however, the surface potential starts to increase from the discharge start voltage Vth through discharge. In this embodiment, the charging voltage to be applied to the charging roller 2 is set at −1100 V, the discharge start voltage Vth is set at −540 V, the charging potential (dark-area potential) Vd is set at −560 V, and the light-area potential V1 is set at −100 V.

A developer container 30 holds, therein, toner 90 as magnetic one-component developer. The toner 90 with predetermined charge polarity is supplied to an electrostatic latent image on the photoconductor drum 4 by the development roller 3 that is a developing member for bearing developer, which visualizes the electrostatic latent image as a toner image. The development roller 3 has a metal core and a conductive elastic layer that is concentrically and integrally formed around the metal core. A non-illustrated development voltage power supply that is a development voltage application unit applies development voltage to the metal core. In this embodiment, the development voltage is set at −240 V.

The transfer roller 41 to which a non-illustrated transfer voltage power supply applies transfer voltage transfers the toner image on the photoconductor drum 4 electrostatically onto the recording medium P. The transfer roller 41 is a transfer member, and the non-illustrated transfer voltage power supply is a transfer voltage application unit. The transfer roller 41 is formed to have a roller-like shape and has a conductive elastic layer on its axis. The transfer voltage is applied to the axis. In this embodiment, the transfer voltage is 1000 V. Thereafter, the fixing unit 6 performs thermal melting and color mixture on the recording medium P so that the toner image is fixed as a permanent image, and a paper sheet is discharged as an image formation material.

2. Optical Scanning Unit

Figure 2A:
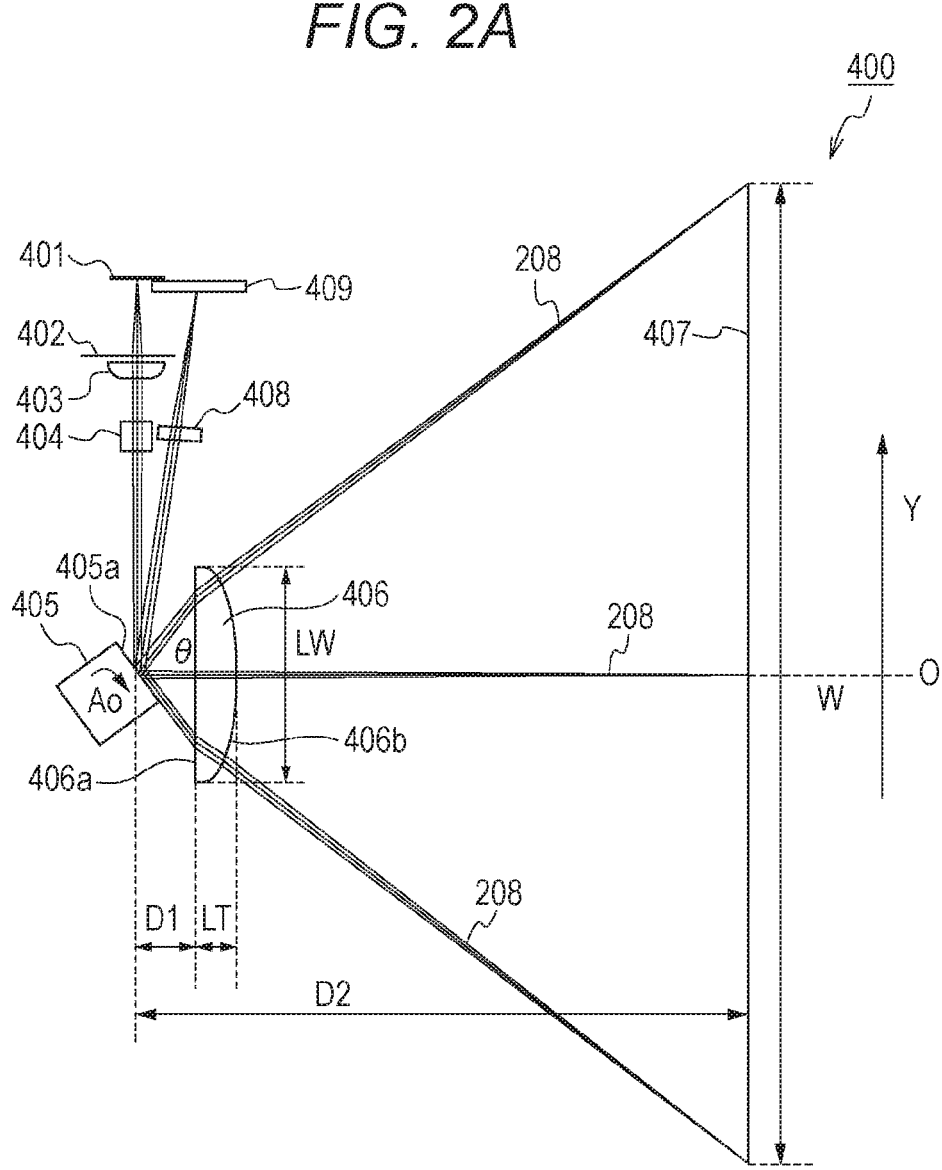
FIG. 2A is a diagram showing the structure of an optical scanning unit in the main scanning direction according to example 1.
Figure 2B:
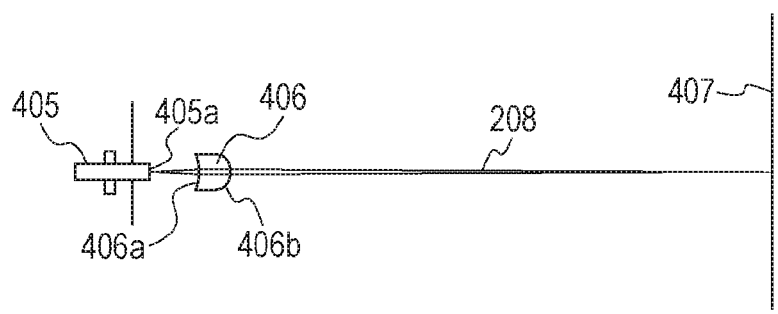
FIG. 2B is a diagram showing the structure of the optical scanning unit in the sub-scanning direction according to example 1.

FIGS. 2A and 2B are diagrams showing the structure of an exposure unit 400 that is an optical scanning unit according to this embodiment. FIG. 2A shows a cross-section in the main scanning direction and FIG. 2B shows a cross-section in the sub-scanning direction. The main scanning direction is a direction that is parallel to the surface of the photoconductor drum 4 and orthogonal to the movement direction of the surface of the photoconductor drum 4. The sub-scanning direction is the movement direction of the surface of the photoconductor drum 4.

An aperture diaphragm 402 shapes the light beam 208 emitted by a light source 401 to have an elliptical shape, and the light beam 208 enters a coupling lens 403. The light beam 208 passing through the coupling lens 403 is converted to substantially parallel light to enter an anamorphic lens 404. Note that the substantially parallel light includes low converged light and low diverging light. The anamorphic lens 404 has a positive refractive power in the main scanning cross-section. The anamorphic lens 404 converts an entering luminous flux to converged light in the main scanning cross-section. The anamorphic lens 404 gathers a luminous flux in the vicinity of a reflecting surface 405a of a deflector (polygon mirror) 405 in the sub-scanning cross-section, and forms a linear image extending in the main scanning direction.

The luminous flux which has passed through the anamorphic lens 404 is reflected off the reflecting surface 405a of the deflector 405. The light beam 208 reflected off the reflecting surface 405a passes through an imaging lens 406 to form an image on the surface of the photoconductor drum 4, so that a predetermined spot-like image (hereinafter, referred to as a spot) is formed. A non-illustrated drive portion drives the deflector 405 to rotate in the direction of an arrow Ao at constant angular velocity. This moves the spot in the main scanning direction on a surface-to-be-scanned 407 of the photoconductor drum 4, so that an electrostatic latent image is formed on the surface-to-be-scanned 407.

A beam detector (hereinafter, referred to as BD) sensor 409 and a BD lens 408 are a synchronization optical system for determining a time at which to write the electrostatic latent image on the surface-to-be-scanned 407. The light beam 208 that has passed through the BD lens 408 enters the BD sensor 409 including a photodiode and is detected. The time at which to write is controlled on the basis of a time at which the BD sensor 409 detects the light beam 208. The light source 401 of this embodiment has one light-emission portion. Instead of this, however, the light source 401 may have a plurality of light-emission portions of which light emission can be controlled independently.

As shown in FIGS. 2A and 2B, the imaging lens 406 has two optical surfaces (lens surfaces) of an incident surface 406a and an exit surface 406b. The imaging lens 406 is so configured that, in the main scanning cross-section, a luminous flux deflected on the reflecting surface 405a scans the surface-to-be-scanned 407 with desired scanning characteristics. Further, the imaging lens 406 is so configured to make a spot of a laser beam 208 on the surface-to-be-scanned 407 have a desired shape.

The imaging lens 406 of this embodiment does not have so-called fθ characteristics. Stated differently, the imaging lens 406 does not have scanning characteristics with which a spot of a luminous flux passing through the imaging lens 406 is moved on the surface-to-be-scanned 407 at constant speed when the deflector 405 rotates at constant angular velocity. Using the imaging lens 406 without fθ characteristics makes it possible to place the imaging lens 406 in the proximity of the deflector 405. To be specific, the deflector 405 can be placed at a position having a small distance D1 shown in FIG. 2A. The imaging lens 406 without fθ characteristics can be downsized in the main scanning direction (width LW) and in the optical axis direction (thickness LT) as shown in FIGS. 2A and 2B as compared to an imaging lens having fθ characteristics. This reduces the size of a housing of the exposure unit 400. In a lens having fθ characteristics, there is sometimes an abrupt change in shape of an incident surface and an exit surface of the lens when the lens is viewed in the main scanning cross-section. Thus, when there are shape constraints, a good imaging performance may not be acquired. In contrast, since the imaging lens 406 does not have fθ characteristics, a good imaging performance can be acquired because of little abrupt change in shape of the incident surface and the exit surface of the lens when the lens is viewed in the main scanning cross-section.

Scanning characteristics of the imaging lens 406 according to this embodiment are expressed by Formula (1) provided below.

[Math. 1]

$$Y = \frac{K}{B}\tan B\theta \qquad \text{Formula (1)}$$

In Formula (1), θ represents a scan angle (scanning field angle) by the deflector 405, Y [mm] represents a light-condensing position (image height) of the luminous flux on the surface-to-be-scanned 407 in the main scanning direction, K [mm] represents an imaging coefficient in an on-axis image height, and B denotes a coefficient (scanning characteristics coefficient) for determining the scanning characteristics of the imaging lens 406. In this example, the on-axis image height represents an image height on an optical axis (Y=0=Ymin) and corresponds to scan angle θ=0. To be specific, in this embodiment, the on-axis image height positions at the central part of the photoconductor drum 4 in the longitudinal direction that is the main scanning direction. An off-axis image height represents an image height (Y≠0) outside the central optical axis (at the time of scan angle θ=0), and corresponds to scan angle θ≠0. Further, a maximum off-axis image height represents an image height (Y=+Ymax, -Ymax) at a time when the scan angle θ is maximum (maximum scanning field angle). A scan width W that is a width, in the main scanning direction, of a predetermined region (scan region) where a latent image can be formed on the surface-to-be-scanned 407 is denoted by W=|+Ymax|+|-Ymax|. In other words, a central part of the predetermined region of the photoconductor drum 4 is the on-axis image height, and an end part thereof is the maximum off-axis image height.

Herein, the imaging coefficient K is a coefficient that corresponds to f of scanning characteristics (fθ characteristics) Y=fθ for the case where parallel light enters the imaging lens 406. In other words, the imaging coefficient K is a coefficient to make the light-condensing position Y and the scan angle θ parallel to each other, as with fθ characteristics, for the case where a luminous flux other than the parallel light enters the imaging lens 406.

In addition, as for the scanning characteristics coefficient, since Formula (1) for the case of B=0 is Y=Kθ, which corresponds to scanning characteristics Y=fθ of an imaging lens used in a conventional exposure unit. Further, since Formula (1) for the case of B=1 is Y=K tan θ, which corresponds to projection characteristics Y=ftan θ of a lens used in an imaging device (usually camera). To be specific, in Formula (1), a scanning characteristics coefficient B is set to fall within a range of 0≤B≤1. This can acquire scanning characteristics between the projection characteristics Y=ftan θ and fθ characteristics Y=fθ.

Herein, when Formula (1) is differentiated by the scan angle θ, a scan rate of a luminous flux on the surface-to-be-scanned 407 with respect to the scan angle θ is calculated as shown in Formula (2).

[Math. 2]

$$\frac{dY}{d\theta} = \frac{K}{\cos^2 B\theta} \qquad \text{Formula (2)}$$

Formula (2) is transformed to obtain Formula (3).

[Math. 3]

$$\frac{\frac{dY}{d\theta}}{K} - 1 = \frac{1}{\cos^2 B\theta} - 1 = \tan^2 B\theta \qquad \text{Formula (3)}$$

Formula (3) expresses deviation amount (partial magnification) of a scan rate of each of the off-axis image heights with respect to the scan rate of the on-axis image height. In cases other than the case of B=0, in the exposure unit 400 according to this embodiment, the scan rate of a luminous flux is different between the on-axis image height and the off-axis image height.

Figure 3:
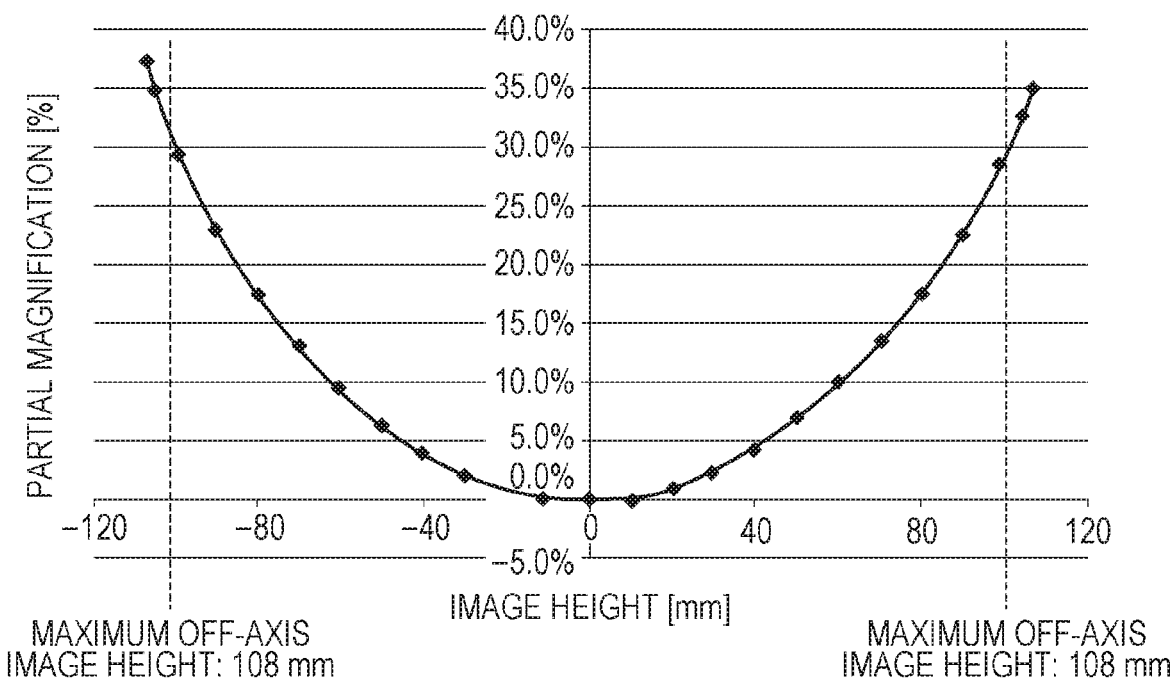
FIG. 3 is a diagram showing a relationship between an image height and a partial magnification according to example 1.

FIG. 3 shows a relationship between an image height and a partial magnification for the case where the scan position on the surface-to-be-scanned 407 according to this embodiment is fitted with the characteristics of Y=Kθ. In this embodiment, the imaging lens 406 is caused to have the scanning characteristics shown in Formula (1). Thereby, as shown in FIG. 3, the partial magnification increases from the on-axis image height toward the off-axis image height because the scan rate is gradually increased. For example, a partial magnification of 30% means that, in the case of light irradiation only for a unit time, the irradiation length in the main scanning direction on the surface-to-be-scanned 407 is 1.3 times longer in the off-axis image height than in the on-axis image height. In the example of FIG. 3, the scan rate is the lowest in the on-axis image height. The scan rate is increased as the absolute value of the image height is increased. Accordingly, if the pixel width in the main scanning direction is determined at regular time intervals determined in accordance with a clock cycle, then pixel density varies between the on-axis image height and the off-axis image height. In this embodiment, therefore, partial magnification correction is performed. To be specific, a clock frequency is adjusted in accordance with the image height in such a manner that the pixel width is substantially constant independently of the image height.

In this embodiment, as shown in FIGS. 2A and 2B, a distance D2 between a point on the deflector 405 at which the laser beam 208 is reflected and a surface-to-be-scanned is 130 mm, W is 216 mm, and a distance to the maximum off-axis image height is W/2, namely, 108 mm Thus, as shown in FIG. 3, a partial magnification Dmax is 30% in the maximum off-axis image height of this embodiment. At this time, B is 0.734. The maximum value of the scan angle θ is 40°.

Figure 4:
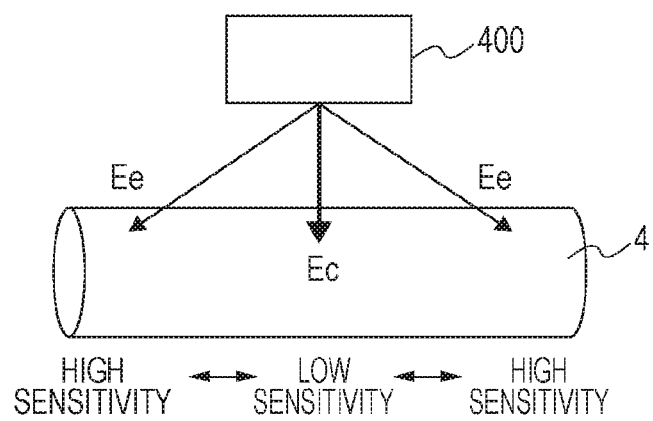
FIG. 4 is a diagram showing a relationship between light quantity by image height and sensitivity of a photoconductor according to example 1.

A time period required to scan a unit length with the image height on the surface-to-be-scanned 407 being close to the maximum off-axis image height is shorter than a time period required to scan a unit length with the image height being close to the on-axis image height. This means that, as shown in FIG. 4, when light emission luminance of the light source 401 is constant, exposure amount (Ee) per unit length with the image height being close to the maximum off-axis image height is smaller than exposure amount (Ec) per unit length with the image height being close to the on-axis image height. In other words, exposure amount of the laser beam 208 reaching the on-axis image height region of the photoconductor drum 4 in the axial direction of the photoconductor drum 4 differs from exposure amount of the laser beam 208 reaching the maximum off-axis image height region. Since Er=Ec/Ee representing a ratio of Ec to Ee indicates a value approximately close to Dmax+100%, Er=Dmax+100%=130%. This means that the light quantity in the proximity of the on-axis image height is 30% stronger than the light quantity in the proximity of the maximum off-axis image height.

In view of this, as shown in FIG. 4 of this embodiment, the photoconductor drum 4 having low exposure sensitivity in the proximity of the on-axis image height and having high exposure sensitivity in the proximity of the maximum off-axis image height is used to offset unevenness in potential due to exposure of the exposure unit 400, and forms a uniform latent image in the longitudinal direction. The sensitivity herein shows a degree as to how much the potential is clearly attenuated with respect to the exposure amount. High sensitivity means a high degree of clear attenuation. Concrete aspects of the photoconductor drum 4 are described later.

3. Control Aspect of Process Cartridge

Figure 5:
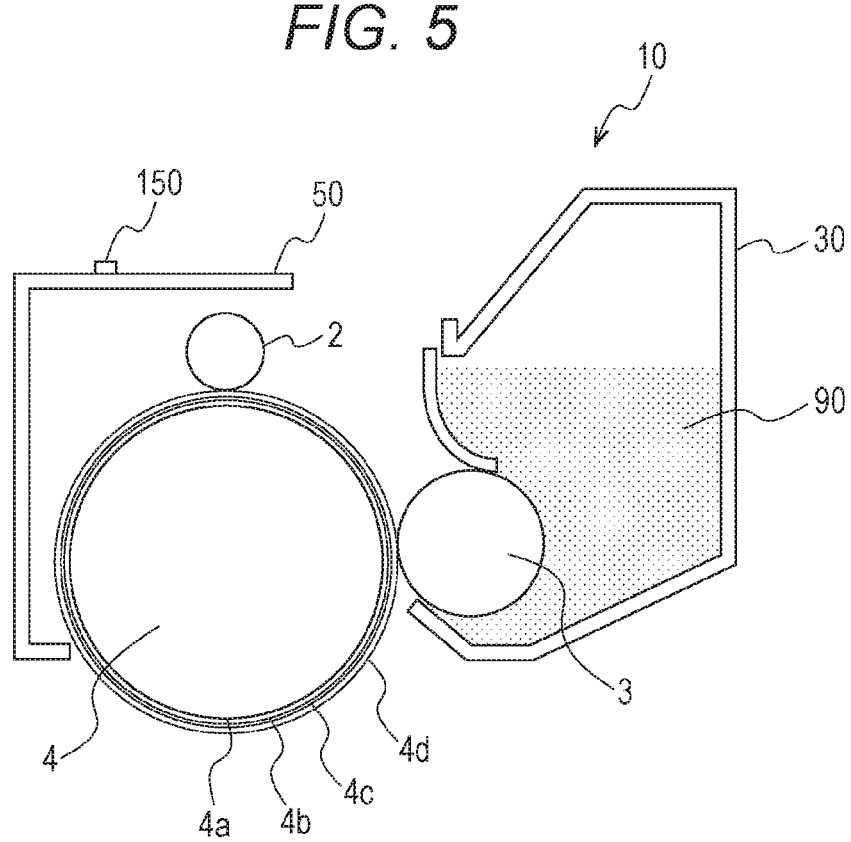
FIG. 5 is a view showing the structure of a process cartridge according to example 1.

FIG. 5 is a schematic sectional view of a process cartridge 10 removably attached to the image forming apparatus 1. In this embodiment, the photoconductor drum 4, the charging roller 2, which is a processing unit on the photoconductor drum 4, and the developer container 30 are housed in a housing 50. The photoconductor drum 4, the charging roller 2, and the developer container 30 are integrated with one another to form the process cartridge 10 removably attached to the image forming apparatus 1. In this embodiment, the process cartridge 10 is provided with a cartridge memory 150 serving as a storage unit. The cartridge memory 150 is attached to the exterior of the housing 50 of the process cartridge 10. The process cartridge 10 is attached to the image forming apparatus 1, enabling a control portion 200, which is provided in the image forming apparatus 1 and serves as a control unit shown in FIG. 6, to read and write information on the cartridge memory 150.

Figure 6:
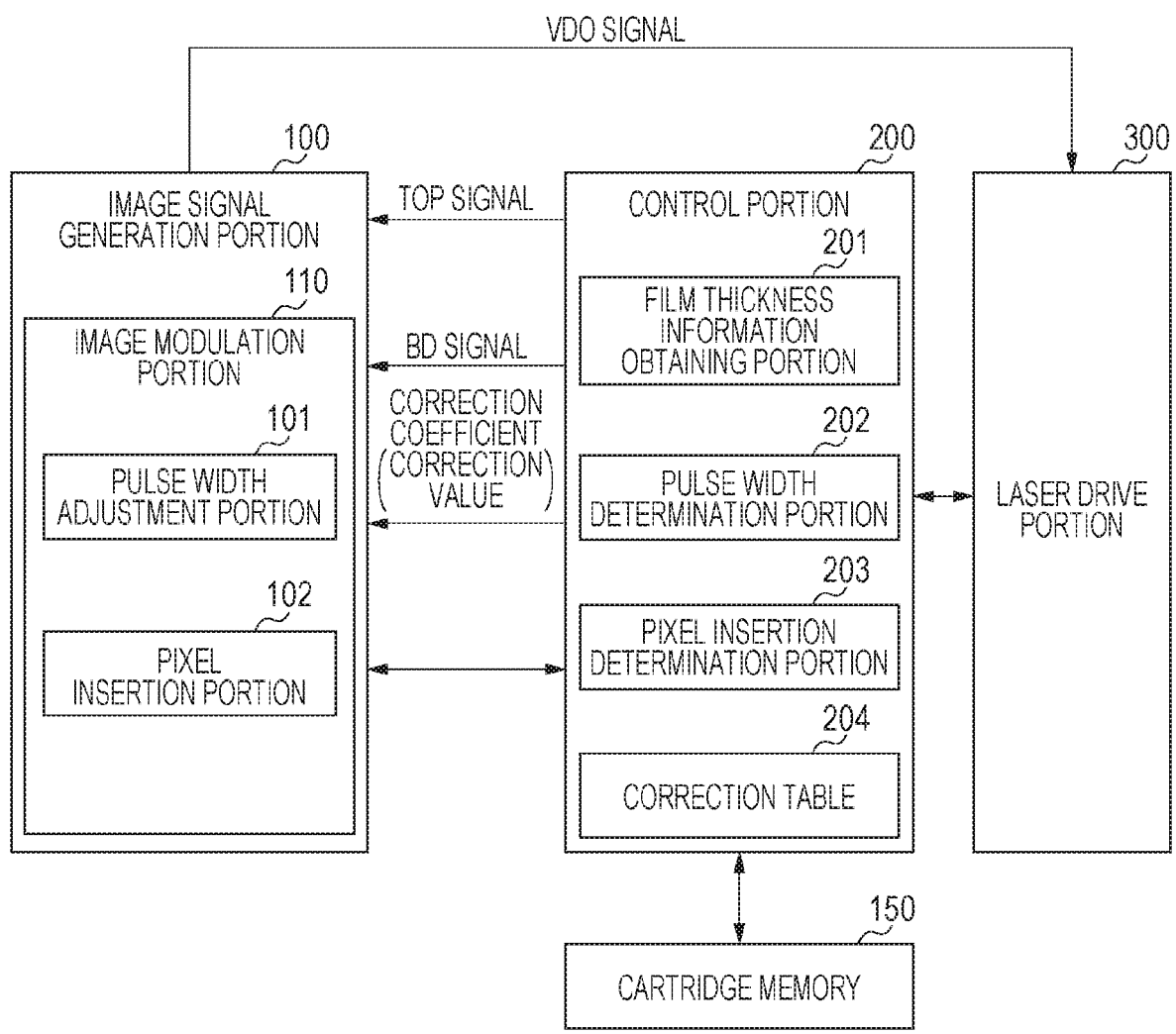
FIG. 6 is a control block diagram according to example 1.

First, a control aspect is described with reference to FIG. 6. The laser drive portion 300 provided in the exposure unit 400 emits the laser beam 208 on the basis of an image signal outputted from the image signal generation portion 100 and a control signal outputted from the control portion 200. The image signal generation portion 100 includes an image modulation portion 110 serving as an image modulation unit. In this embodiment, the image modulation portion 110 includes a pulse width adjustment portion 101 serving as a pulse width adjustment unit and a pixel insertion portion 102 serving as a pixel insertion unit. A non-illustrated CPU of the image signal generation portion 100 controls the image modulation portion 110 in accordance with a program stored in a non-illustrated ROM of the image signal generation portion 100, so that the foregoing functions of the image signal generation portion 100 are implemented. The image signal generation portion 100 receives image data from a host device such as a host computer connected to the image forming apparatus 1, and generates a VDO signal (image signal) corresponding to the image data.

In this embodiment, the control portion 200 controls an overall operation of the image forming apparatus 1. The control portion 200 includes a film thickness information obtaining portion 201 serving as a film thickness information obtaining unit, a pulse width determination portion 202 serving as a pulse width determination unit, and a pixel insertion determination portion 203 serving as a pixel insertion determination unit. A non-illustrated CPU of the control portion 200 controls the control portion 200 in accordance with a program stored in a non-illustrated ROM of the control portion 200, so that the foregoing functions of the control portion 200 are implemented. The ROM of the control portion 200 stores, in advance, pulse width adjustment information and pixel insertion information as correction information 204.

The image signal generation portion 100 gives a print start command to the control portion 200 when preparation for outputting a VDO signal (image signal) for image formation is made. In response to the command, when printing preparation is made, the control portion 200 outputs a TOP signal and a BD signal to the image signal generation portion 100. The TOP signal is a sub-scanning synchronization signal for informing positional information on the leading edge of the recording medium P. The BD signal is a main scanning synchronization signal for informing positional information on the left edge of the recording medium P. The image signal generation portion 100 receives the two types of synchronization signal and outputs a VDO signal to the laser drive portion 300 of the exposure unit 400 at a predetermined time. The laser drive portion 300 supplies a current to the light source 401 on the basis of the VDO signal to make the light source 401 lit. In this embodiment, the image signal generation portion 100 performs processing for adjusting the clock frequency of an image clock that is a clock of the VDO signal.

In this embodiment, the image signal generation portion 100 and the control portion 200 control the exposure unit 400 on the basis of image data. The mounting mode of the individual functional blocks is not limited to that of this embodiment. For example, a part or the whole of the film thickness information obtaining portion 201, the pulse width determination portion 202, and the pixel insertion determination portion 203 may be implemented in the image signal generation portion 100.

After a charging process, the control unit 200 controls the exposure unit 400 to expose the photoconductor drum 4 with the laser beam 208. As shown in FIG. 5, the laser beam 208 passes through a charge transport layer 4d that is an outer layer having a light-transmitting property of the photoconductor drum 4 to reach a charge generation layer 4c. The light-transmitting property (translucent) of the outer layer of the photoconductor drum 4 allows light to pass through sufficiently to reach the charge generation layer 4c. The light is, for example, the laser beam 208 that the exposure unit 400 applies to the photoconductor drum 4 to form a latent image. Thereby, an electron-positive hole pair is generated in the charge generation layer 4c by photoexcitation. The surface of the photoconductor drum 4 is charged in advance at Vd due to the charging process by the charging roller 2; therefore, the positive hole moves to the charge transport layer 4d to cancel the electrified charge, and the absolute value of potential at the exposed part is lowered. Consequently, a potential difference between the light-area potential V1 and the dark-area potential Vd is generated in the surface of the photoconductor drum 4 and a latent image is formed.

In this embodiment, the cartridge memory 150 stores, therein, information on film thickness of the photoconductor drum 4 showing the thickness of the outer layer of the photoconductor drum 4 (charge transport layer 4d in this embodiment). The repetition of image formation gradually scrapes the charge transport layer 4d, which is the outermost layer of the photoconductor drum 4, due to discharge at the time of charging process by the charging roller 2, rubbing against the development roller 3 or the recording medium P, and so on. For this reason, the film thickness of the photoconductor drum 4 changes with amount of use of the photoconductor drum 4 increasing, and the film thickness thereof is usually reduced.

The film thickness of the photoconductor drum 4 can be predicted on the basis of information on amount of use of the photoconductor drum 4. As the information on amount of use of the photoconductor drum 4, any indication correlated with the amount of use of the photoconductor drum 4 can be used, for example, the number of rotations of the photoconductor drum 4, the rotation time thereof, the number of rotations thereof during the charging process, and the rotation time thereof during the charging process can be used. A combination of the indication may be used. In such a case, the film thickness information may be information on amount of use of the photoconductor drum 4, or a film thickness value of the photoconductor drum 4 obtained from the information.

The film thickness of the photoconductor drum 4 may be determined through calculation by the film thickness information obtaining portion 201. First, when the photoconductor drum 4 is driven, the rotation time of the photoconductor drum 4 is counted, appropriately accumulated, and stored in the cartridge memory 150. Next, the film thickness information obtaining portion 201 reads the current accumulated rotation time of the photoconductor drum 4 stored in the cartridge memory 150 to determine the current film thickness of the photoconductor drum 4. The ROM of the control portion 200 stores, therein, information on a relationship between the accumulated rotation time of the photoconductor drum 4 determined in advance and the film thickness of the photoconductor drum 4. The film thickness information obtaining portion 201 determines, on the basis of the information, the current film thickness of the photoconductor drum 4 from the current accumulated rotation time of the photoconductor drum 4.

The film thickness of the photoconductor drum 4 can be detected directly by eddy current film thickness measurement, for example. In such a case, the film thickness information may be a detected signal value in accordance with the measurement method, a film thickness value determined from the detected signal value, and so on.

In this embodiment, in terms of downsizing and cost reduction of the image forming apparatus 1, the method is used which involves predicting a film thickness of the photoconductor drum 4 on the basis of, as the film thickness information, accumulated rotation time of the photoconductor drum 4 accumulated from when the photoconductor drum 4 was new. Stated differently, the rotation time of the photoconductor drum 4 since the photoconductor drum 4 was new is appropriately stored into the cartridge memory 150. Then, the current film thickness of the photoconductor drum 4 is determined from the current accumulated rotation time of the photoconductor drum 4 on the basis of a relationship between the accumulated rotation time of the photoconductor drum 4, which is determined in advance, and the film thickness of the photoconductor drum 4.

In some cases, a plurality of types of process cartridge 10 line up which are attachable to the same image forming apparatus 1 and have different number of printable sheets. In such a case, photoconductor drums 4 that have different film thicknesses in a brand-new state are sometimes used in the individual types of process cartridge 10. In such a case, the cartridge memory 150 may store, therein, film thickness information on the new photoconductor drums 4. To be specific, the cartridge memory 150 of the different types of process cartridge 10 having different number of printable sheets may store, therein, different pieces of film thickness information at the time when the photoconductor drums 4 are new. The film thickness information in a brand-new state can be stored into the cartridge memory 150 when the process cartridge 10 is manufactured or is shipped to a factory. The film thickness information in a brand-new state may be information on film thickness value of the new photoconductor drum 4, information for designating the film thickness value, for example, may be information such as individual identification information or model information that can be converted to a film thickness value in the main body of the device.

Methods for obtaining the film thickness information are not limited by the present disclosure, and any usable method can be used appropriately to obtain the film thickness information.

The exposure unit 400 of this embodiment performs normal exposure on an image part at which to form a toner image by adding toner of the corresponding photoconductor drum 4, and also performs micro exposure on a non-image part at which to form no images and which acts as a background part of a latent image. In the micro exposure, exposure amount is smaller than that in normal exposure. The micro exposure to the non-image part is called background exposure. The laser drive portion 300 can switch a laser power in two stages of P1 for non-image part exposure and P2 for image exposure, and the exposure amount is P1<P2. The non-image part is subjected to background exposure by light emission at a laser power value P1 on the basis of image data outputted from the image signal generation portion 100. The image part is subjected to normal exposure by light emission at P2. In this embodiment, an initial value of P1 of the photoconductor drum 4 is set at 0.10 $\mu J/cm^2$, and P2 is set at 0.40 $\mu J/cm^2$. In one embodiment, P1 is adjusted to fall within a range of 0.02 to 0.15 $\mu J/cm^2$, and P2 to fall within a range of 0.28 to 0.55 $\mu J/cm^2$. As described above, the specific values of P1 and P2 are values in the maximum off-axis image height. The light quantity in the on-axis image height is a value obtained by multiplying the respective values by light quantity ratio Er.

The description goes on to the background exposure. The surface of the photoconductor drum 4 is temporarily charged with post-charge pre-exposure potential Vd0 whose absolute value is equal to or larger than the dark-area potential Vd by the charging roller 2 to which a charging voltage is applied. After that, with respect to the rotational direction of the photoconductor drum 4, the exposure unit 400 is caused to emit light with exposure amount P1 to perform background exposure on the surface of the photoconductor drum 4, then to attenuate (drop) the surface potential. This method can be used to obtain a target dark-area potential Vd with not only the charging process but also the exposure process. Even when the absolute value of the charging voltage is large, this method enables the surface potential of the photoconductor drum 4 that has passed through a charging portion in the rotational direction and has not yet reached a developing part to be lowered in advance.

4. Layer Structure of Photoconductor Drum

As shown in FIG. 5, the photoconductor drum 4 used in the image forming apparatus 1 of this embodiment is a multilayer photoconductor in which the charge generation layer 4c and the charge transport layer 4d are formed in this order on a conductive support member 4a including an undercoat layer 4b.

The conductive support member 4a is provided by using alloy having a principal component of metal such as aluminum to have a drum-like shape.

A known method can be used to provide the undercoat layer 4b with known organic materials and inorganic materials. Examples of the undercoat layer 4b include a layer having a principal component of resin or a principal component of white pigment and resin, and metal oxide film of which a conductive support surface is oxidized chemically or electrochemically. Examples of the resin for use in the undercoat layer 4b include thermoplastic resins such as polyamide, polyvinyl alcohol, casein, methylcellulose; and thermosetting resins such as acrylic resins, phenol resins, melamine resins, alkyd resins, unsaturated polyethylene resins and epoxy resins. Examples of the white pigment include metal oxides such as titanium oxide, aluminum oxide, zirconium oxide and zinc oxide. Above all, titanium oxide, which is excellent in preventing injection of electrical charge from a conductive support. Among the white pigment of the undercoat layer 4b, the amount of use of titanium oxide is, on a weight basis, 60 to 100%, 70 to 100%, or 80 to 100%. When the amount of use of titanium oxide is lower than 60%, the characteristics of the undercoat layer 4b easily varies due to environmental variation, effect of blocking injection of electrical charge from the conductive support member 4a is unstable, which is not desirable. The film thickness of the undercoat layer 4b is 0.1 µm to 30 µm, or 10 to 25 µm.

As with the case of the undercoat layer 4b, a known method can be used to provide a photosensitive layer including the charge generation layer 4c and the charge transport layer 4d used in the image forming apparatus 1 of this embodiment. As materials making the photosensitive layer, known organic materials and inorganic materials can be used. Further, a protective layer and so on may be provided on the surface of the photosensitive layer. Examples of charge generation materials for use in the photoconductor drum 4 of the present embodiment include organic pigments and dyes such as mono azo pigments, bis azo pigments, tris azo pigments, tetrakis azo pigments, triarylmethane dyes, thiazine dyes, oxazine dyes, xanthene dyes, cyanine dyes, styryl dyes, pyrylium dyes, quinacridone pigments, indigo pigments, perylene pigments, polycyclic quinon pigments, bisbenzimidazole pigments, indanthrene pigments, squalirium pigments, phthalocyanine pigments; and inorganic materials such as selenium, selenium-arsenic, selenium-tellurium, cadmium sulfide, zinc oxide, titanium oxide, amorphous silicon. The charge generation materials may be used alone or in combination.

As described above, in order to provide a deviation in sensitivity of the photoconductor drum 4 used for image formation in this embodiment, a deviation in the amount of adhesion of the charge generation material is provided. As methods for providing such a deviation, either wet process or dry process can be used; in one embodiment, the wet process having excellent in mass productivity is used. For the cylindrical photoconductor drum 4 in this embodiment, dip coating or spray coating is used. In the dip coating, the thickness of a coated film varies depending on a pulling speed of the conductive support member 4a which has been dipped into a coating liquid. In view of this, pulling the conductive support member 4a with the pulling speed of the photoconductor drum 4 changed makes it possible to provide a predetermined deviation in the thickness of the coated film. In the spray coating, providing a deviation in the amount of a coating solution sprayed makes it possible to change the thickness of the coated film.

Examples of charge transport material for use in the photoconductor drum 4 of the present embodiment include anthracene derivatives, pyrene derivatives, carbazole derivatives, tetrazole derivatives, metallocene derivatives, phenothiazine derivatives, pyrazoline compounds, hydrazone compounds, styryl compounds, styrylhydrazone compounds, enamine compounds, butadiene compounds, distyryl compounds, oxazole compounds, oxadiazole compounds, thiazol compounds, imidazole compounds, triphenylamine derivatives, phenylenediamine derivatives, aminostilbene derivatives and triphenylmethane. The charge transport material may be used alone or in combination.

As a binder resin for use in formation of the photosensitive layer, any well-known thermoplastic resin, thermosetting resin, photosetting resin or photoconductive resin can be used. Examples of the appropriate binder resin include thermoplastic resins such as polyvinyl chloride resins, polyvinylidene chloride resins, vinyl chloride-vinyl acetate copolymer resins, vinyl chloride-vinyl acetate-maleic anhydride terpolymer resins, ethylene-vinyl acetate copolymer resins, polyvinyl butyral resins, polyvinyl acetal resins, polyester resins, phenoxy resins, (meth)acrylic resins, polystyrene resins, polycarbonate resins, polyallylate resins, polysulfone resins, polyethersulfone resins, and ABS resins; thermosetting resins such as phenol resins, epoxy resins, urethane resins, melamine resins, isocyanate resins, alkyd resins, silicone resins, thermosetting acrylic resins; and polyvinyl carbazole resins, polyvinyl anthracene resins, and polyvinyl pyrene resins. The binder resins may be used alone or in combination.

In this embodiment, each layer is formed by the dip coating. In order to make the sensitivity of the on-axis image height of the photoconductor drum 4 low, and to make the sensitivity of the maximum off-axis image height thereof high, in one embodiment, the thickness of the photosensitive layer be modulated in the axial direction in a manner to have the thinnest layer in the on-axis image height and have a thicker layer as closer to the maximum off-axis image height. In the dip coating, the thickness of a coated film varies depending on a pulling speed of the conductive support member 4a which has been dipped into a coating liquid. In view of this, pulling the conductive support member 4a with the pulling speed of the photoconductor drum 4 changed makes it possible to modulate the film thickness in the axial direction.

Other methods for making the sensitivity of the on-axis image height of the photoconductor drum 4 low and making the sensitivity of the maximum off-axis image height thereof high include the following method. For example, in using a spray method or an inkjet method to form a photosensitive layer, two kinds of liquid A and B different in charge generation material density are prepared, and a percentage of spraying the two types of liquid A and B is changed depending on the image height position. For the case of making the liquid A have higher charge generation material density, the percentage of liquid A is higher than the liquid B at the maximum off-axis image height position, the percentage of liquid B is higher than the liquid A at the on-axis image height position, and the ratio of the liquid A to the liquid B is changed step by step.

5. Concrete Manufacturing Method of Photoconductor Drum

The description goes on to a concrete manufacturing method of the photoconductor drum 4 used in this embodiment.

First, acrylic resin (Acrydic A-460-60 produced by DIC corporation) 15 parts and melamine resin (Super Beckamine L-121-60 produced by DIC corporation) 10 parts are dissolved into methyl ethyl ketone 80 parts. Titanium oxide powder (TM-1 produced by Fuji Titanium Industry Co., Ltd.) 90 parts are added to the resultant, dispersed by a ball mill for 12 hours to prepare a coating solution for the undercoat layer 4b. The coating solution for the undercoat layer 4b is applied to an aluminum drum that is the conductive support member 4a having an outer diameter of 24 mm, a length of 225 mm, and a thickness of 1 mm with the dip coating in which the pulling speed is constant. Then, the resultant is dried at 140° C. for 20 minutes to form the undercoat layer 4b having a thickness of 2 μm. Next, butyral resin (S-LEC BLS produced by Sekisui Chemical Co., Ltd.) 15 parts are dissolved into cyclohexanone 150 parts, and tris azo pigment 10 parts having the following chemical formula (A) are added to the resultant and dispersed by the ball mill for 48 hours.

Subsequently, cyclohexanone 210 parts are added, and the resultant is dispersed for three hours. While being so stirred as to have a solid content of 1.5%, the resultant is diluted with cyclohexanone to prepare a coating liquid for the charge generation layer 4c. The coating liquid for the charge generation layer 4c is used to form the charge generation layer 4c while dip coating is applied to the undercoat layer 4b with the pulling speed changed.

Further, charge transport material 6 parts of the following chemical formula (B), polycarbonate resin (Panlite K-1300 produced by Teijin Chemicals Ltd.) 10 parts, and silicone oil (KF-50 manufactured by Shin-Etsu Chemical Co., Ltd.) 0.002 parts are dissolved into methylene chloride 90 parts to prepare a charge transport layer 4d coating liquid.

[Chemical formula 2]

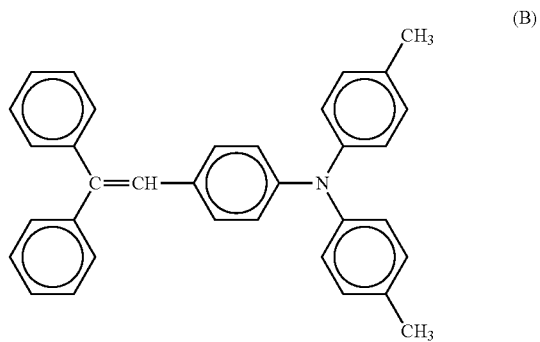

(B)

The coating liquid for the charge transport layer 4d is applied onto the charge generation layer 4c by dip coating and dried to form the charge transport layer 4d having a thickness of 10 μm, so that the photoconductor drum 4, which is an electrophotographic photoconductor, is made.

[Chemical formula 1]

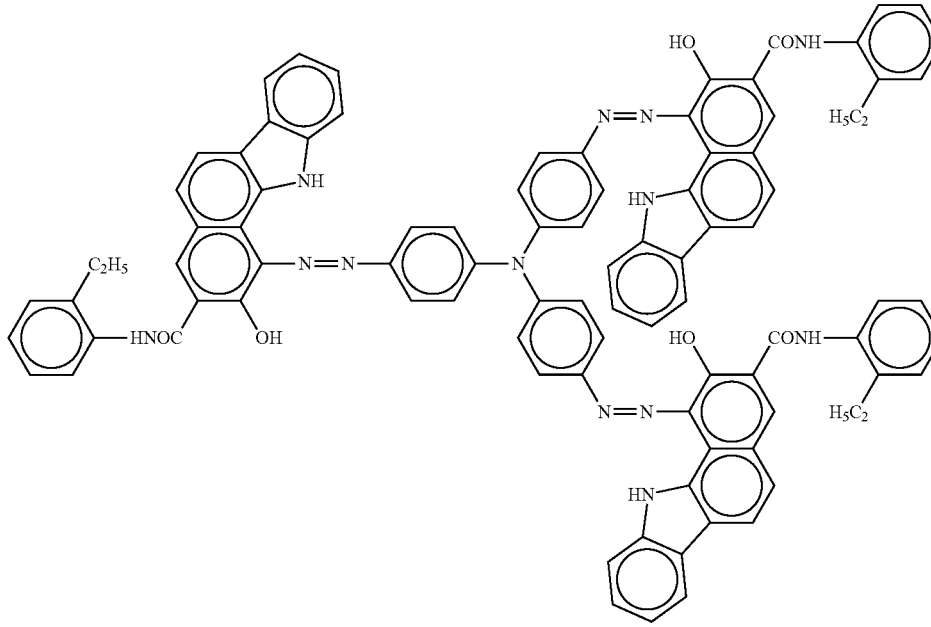

(A)

Across the entire area of the photoconductor drum 4, uneven thickness of the film is equal to or smaller than ±0.5 μm.

Change in sensitivity of the photosensitive layer in the scanning direction is estimated by making a measurement of the surface of the photoconductor drum 4 with Macbeth densitometer (model 500 manufactured by X-Rite, Inc.). As the film thickness of the photosensitive layer is large, sensitivity of the photosensitive layer tends to be high and Macbeth density tends to be high. The charge generation layer 4c has a film thickness of submicron order, and is difficult to be measured with an eddy current method described later. Since the charge transport layer 4d is transparent, estimating the sensitivity of the photosensitive layer with density by the Macbeth densitometer is easier and more precise.

Table 1 shows a measurement result of Macbeth density of the photoconductor drum 4 produced. Table 1 also shows a measurement result of modification examples, a comparative example and example 2 described later. Referring to the result of the entire area of the photoconductor drum 4 in the longitudinal direction according to comparative example 1 and the result of Macbeth density at the on-axis image height position of the photoconductor drum 4 according to example 1, example 2, modification example 1, and modification example 2, variation $\Delta t$ of the charge generation layer 4c is as follows: $\Delta t = tmax - tmin = 0.907 - 0.864 = 0.043$. In contrast, as for the charge generation layer 4c at the on-axis image height position and the charge generation layer 4c at the maximum off-axis image height position of the photoconductor drum 4 according to example 1, a film thickness difference is as follows: $\Delta t = 1.17 - 0.867 = 0.303$. Thus, a difference between the charge generation layer 4c at the on-axis image height position and the charge generation layer 4c at the maximum off-axis image height position of the photoconductor drum 4 used in example 1 is set to be sufficiently larger than a difference in film thickness of the charge generation layer 4c of the photoconductor drum 4 used in comparative example 1. In the foregoing method, the sensitivity of the charge generation layer 4c is measured with Macbeth density. The sensitivity of the photoconductor drum 4 in the longitudinal direction thereof can be also determined by direct measurement of the surface potential of the photoconductor drum 4. However, where the exposure unit 400 of this example is used to make measurement of the image part potential V1, exposure amount of the laser beam 208 reaching the photoconductor drum 4 is different between the on-axis image height position and the maximum off-axis image height position. Thus, the film thickness of the charge generation layer 4c and the exposure amount of the photoconductor drum 4 (Ec and Ee) offset each other, so that the actual sensitivity cannot be determined. In view of this, the following method for measurement of the sensitivity of the photoconductor drum 4 is used.

The exposure amount reaching the photoconductor drum 4 is made uniform in the longitudinal direction by the laser beam 208 exposing and scanning in the main scanning direction at a constant scan rate, instead of the exposure unit 400 of this example. For example, an exposure unit including a lens having fθ characteristics is used for measurement of surface potential. In such a case, since exposure amount at the on-axis image height position on the photoconductor drum 4 is the same as exposure amount at the maximum off-axis image height position on the photoconductor drum 4, sensitivity in the charge generation layer 4c can be compared simply. Stated differently, after charging by the charging roller 2, the surface potential formed in the photoconductor drum 4 at the time of exposing the surface is sensitivity of the charge generation layer 4c as-is. Accordingly, the larger the absolute value of the surface potential is, the smaller the sensitivity is.

The charge generation layer 4c of the photoconductor drum 4 used in example 1 is characterized as follows. It is supposed that the exposure unit including a lens having fθ characteristics is used to measure surface potential on the surface of the photoconductor drum 4 charge by the charging roller 2. The film thickness of the charge generation layer 4c is so adjusted that the following relationship is established in the surface potential, of the photoconductor drum 4, formed in the case where a first region is exposed at a first scan rate. To be specific, the charge generation layer 4c is formed in such a manner that the absolute value of the surface potential of the first region is larger than the absolute value of the surface potential, of the photoconductor drum 4, formed in the case where a second region is exposed at the first scan rate (the same scan rate) with the same exposure amount as the exposure amount to the first region.

TABLE 1

|  | Image height position (mm) | | | | |
| --- | --- | --- | --- | --- | --- |
|  | −108 | −54 | 0 | 54 | 108 |
| Example 1 | 1.13 | 1.08 | 0.867 | 1.06 | 1.17 |
| Modification example 1 | 1.09 | 1.05 | 0.870 | 1.04 | 1.09 |
| Modification example 2 | 1.24 | 1.10 | 0.869 | 1.09 | 1.23 |
| Comparative example 1 | 0.864 | 0.865 | 0.870 | 0.882 | 0.876 |
| Example 2 | 1.13 | 1.09 | 0.907 | 1.08 | 1.17 |

6. Photoconductor Drum Surface Potential

In this embodiment, a reversal development method is used in which negative polarity of charge polarity of the toner 90 and negative polarity of charge polarity of the photoconductor drum 4 are regarded as normal polarity. As the charging method, a DC charging method is used in which the charging roller 2, which is a conductive rubber roller, is caused to contact the photoconductor drum 4 and applies a direct-current voltage thereto while rotating following the photoconductor drum 4. While an image is formed, a direct-current voltage of −1100 V is applied to the charging roller 2. The surface potential of the photoconductor drum 4 is charged evenly at −560 V by the charging roller 2, and then the exposure unit 400 forms a latent image. Table 2 shows, as to the proximity of the on-axis image height and the proximity of the maximum off-axis image height, post-charge potential Vd0, post-background exposure non-image part potential Vd, and image part potential V1. The post-background exposure non-image part potential Vd is evenly attenuated to −360 V in the longitudinal direction by background exposure, and the image part potential V1 is attenuated to fall within a range of −100 V to −85 V by normal exposure. The development voltage to be applied to the development roller is set at −240 V to establish such a potential relationship that the toner 90 having negative polarity is not adhered to the non-image part and the toner 90 is adhered to the image part. This visualizes the latent image formed on the photoconductor drum 4.

Herein, the development voltage in this embodiment is expressed as a potential difference to the earth potential. Accordingly, a development voltage=−240 V is interpreted as having a potential difference of −240 V by a development voltage applied to the metal core of the development roller 3 with respect to the earth potential (0 V). The same applies to a charging voltage. Hereinafter, when a development voltage applied to the development roller 3 and a charging voltage applied to the charging roller 2 are expressed as a potential difference, expressions of development potential and charging potential are sometimes used, respectively.

The description goes on to a back contrast Vback that is a potential difference between Vd and the development potential, and a development contrast Vcont that is a potential difference between V1 and the potential difference. Table 2 also shows Vback and Vcont in the on-axis image height and the maximum off-axis image height.

TABLE 2

| Example 1 | Vd0 (V) | Vd (V) | V1 (V) | Vback (V) | Vcont (V) |
|---|---|---|---|---|---|
| On-axis image height | −560 | −360 | −100 | 120 | 140 |
| Maximum off-axis image height | −560 | −360 | −85 | 120 | 155 |

A smaller value of Vback and a larger value of Vcont makes halftone density thicker and makes line thickness of a line image thicker. Further, the amount of fog toner changes depending on a value of Vback. The fog toner means toner excessively adhered to the non-image part of the photoconductor drum 4. The fog may not be beneficial to a user because toner is adhered to a part other than a desired part for image formation so that a white part, which is the non-image part, has a tint. A small value of Vback weakens an electric field for keeping the toner on the development roller 3, and fog of the normal polarity toner 90 is generated in the non-image part of the photoconductor drum 4. In contrast, a large value of Vback causes fog of toner having reverse polarity in which the toner 90 charged to opposite polarity on the development roller 3 is adhered to the non-image part of the photoconductor drum 4. Thus, Vback is set so that the amount of fog is least.

Figure 7:
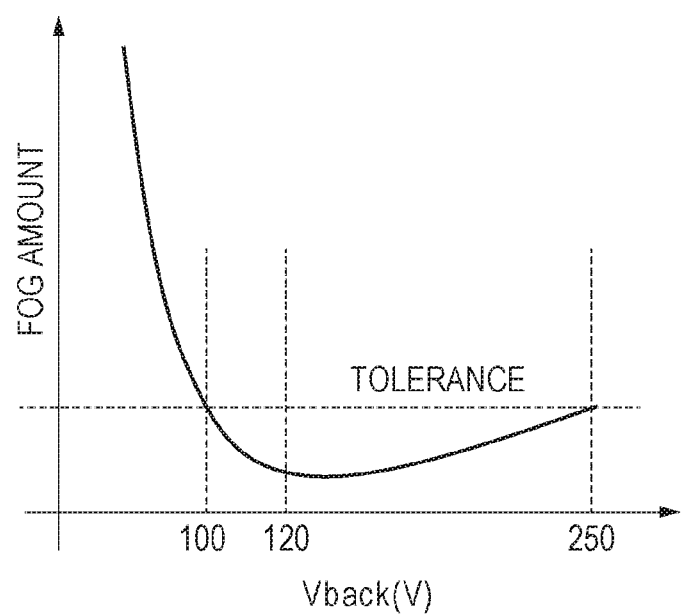
FIG. 7 is a diagram showing a relationship between fog amount and surface potential of a photoconductor according to example 1.

FIG. 7 shows a relationship between Vback and fog. The graph shows Vback in the horizontal axis, and amount of fog in the vertical axis. The amount of fog is measured as follows. The toner 90 on the photoconductor drum 4 is taken off by taping with Mylar tape, and the tape with toner is stuck on reference paper. The density thereof is measured by a reflection densitometer (TC-6DS/A) produced by Tokyo Denshoku Co., Ltd. As a method for calculating the amount of fog, the image forming apparatus 1 is used to perform image forming operation, and the calculation is made on the basis of toner amount on the photoconductor drum 4 at a time when development is made with Vback changed without the recording medium P. Since fog having amount equal to or smaller than a constant value is not visible, no problem arises in image. However, increase in fog amount makes the fog visible, which results in adverse effect in an image. In light of this, Vback is usually set at such a small value that fog is made invisible. In this embodiment, as shown in FIG. 7, Vback is set at 120 V that is in a region below a fog tolerance. A range where fog is made invisible is a range for the case where Vback is set to fall within a range of 100 V to 250 V. In particular, in one embodiment, Vback is set to fall within a range of 110 V to 150 V.

In this embodiment, Vback is so set as to have 120 V at which the amount of fog toner is least. It is to have fog as little as possible in order to reduce the consumption of toner, avoid making dirt in the transfer member, or output an image with good quality. The development system from the development roller 3 to the photoconductor drum 4 is a magnetic one-component jumping development system in which the development voltage is a voltage resulted from superimposing rectangular alternating voltage on direct-current voltage, and the development potential is a voltage average value of alternating voltage for one cycle.

7. Adverse Effect in Image Due to Photoconductor Drum and Solving Means Thereof

Figure 8A:
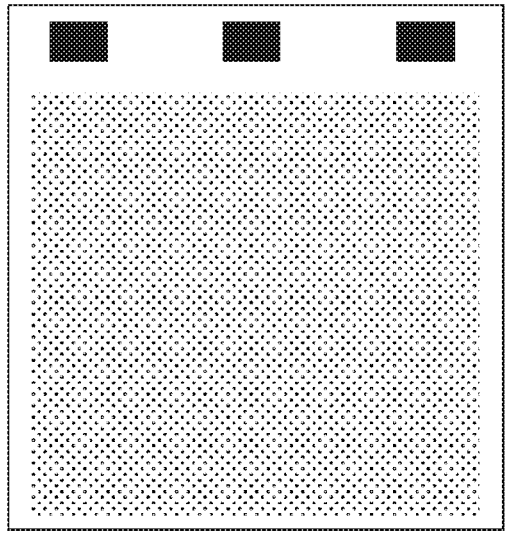
FIG. 8A is a diagram showing an image used for examination of an example and a comparative example.
Figure 8B:
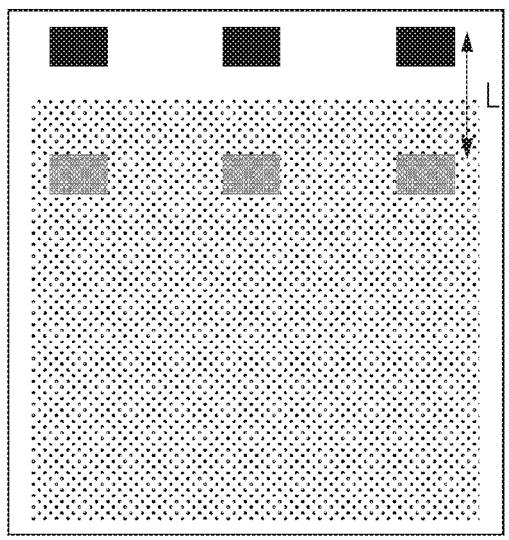
FIG. 8B is a diagram showing an image in which ghosting is caused of an example and a comparative example.

The photoconductor drum 4 is set in the image forming apparatus 1 and the surface potential of the photoconductor drum 4 is adjusted. In such a state, when an image as that shown in FIG. 8A is outputted, adverse effect sometimes occurs in an image as shown in FIG. 8B. This is due to an image defect called ghosting. Ghosting is caused at a distance L away from the leading edge of solid black patch printing, as shown in FIG. 8B, after the photoconductor drum 4 rotates one time. In particular, ghosting is noticeable under a high-temperature and high-humidity environment. To be specific, ghosting is a phenomenon in which, in the case of forming an image again in a part at which a solid black patch is printed at the image part, surface potential cannot be formed on a desired photoconductor drum 4, and the density changes.

A mechanism for causing ghosting is described below.

Figure 9:
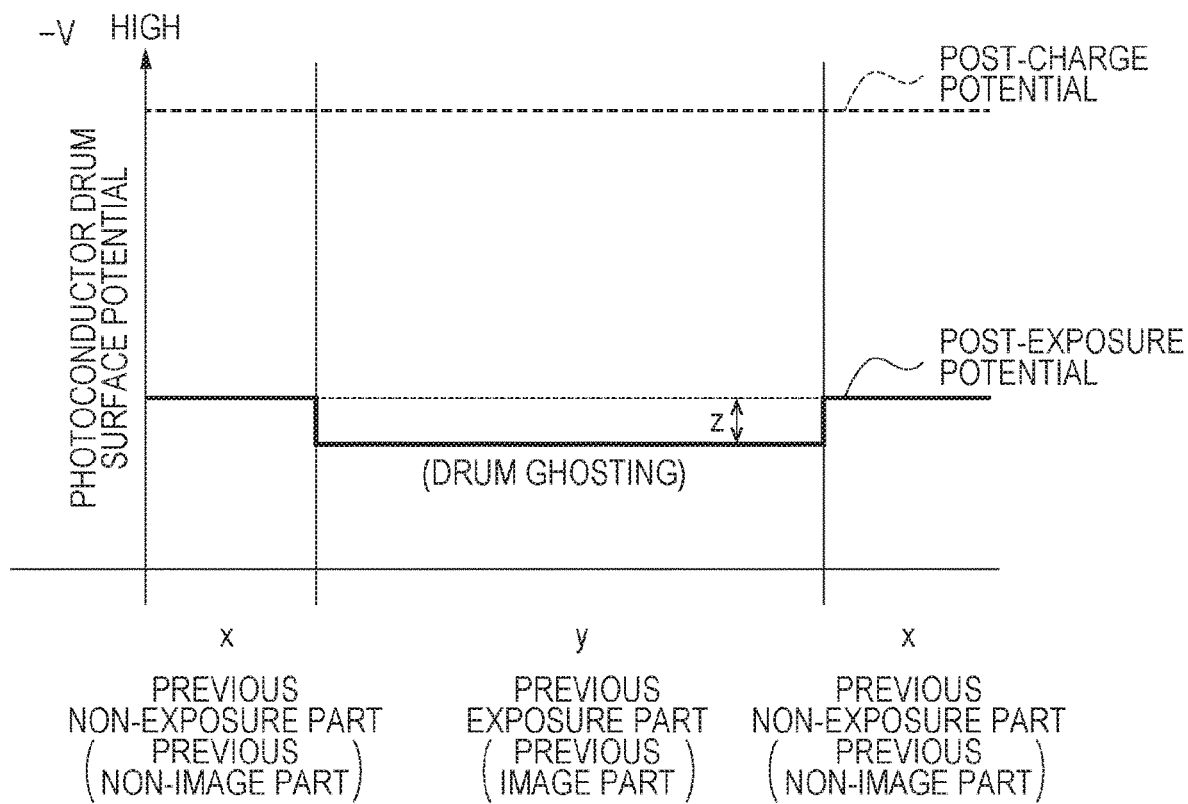
FIG. 9 is a diagram showing surface potential of a photoconductor in example 1.

In some cases, a ghost image is caused due to a potential difference at a time when a part exposed and a part unexposed on the photoconductor drum 4 are charged in the next charging process. In the part that has been subjected to exposure in the previous process, a potential difference is generated in the next charging process due to influence of charge remaining inside the charge transport layer 4d. The situation is shown in FIG. 9. FIG. 9 shows a relationship between the surface potential of the photoconductor drum 4 and the longitudinal position, and shows the surface potential of the photoconductor drum 4 at a time when the part that has been subjected to exposure and the part that has not been subjected to exposure in the axial direction of the photoconductor drum 4 are charged again and exposed again. As shown in FIG. 9, when the part that has been subjected to exposure in the previous process (previous image part y) and the part that has not been subjected to exposure in the previous process (previous non-image part x) are exposed again in the exposure process, a different (z part in FIG. 9) is generated in potential after exposure. Stated differently, the potential difference between the previous image part y that has been printed one rotation before the rotation of the photoconductor drum 4 and the previous non-image part x that has not been printed one rotation before the rotation of the photoconductor drum 4 still remains in the photoconductor drum 4 in the next image-forming period. If the potential difference is large, then ghosting, which is a density difference, is caused in an image eventually formed. In particular, in the photoconductor drum 4 of this embodiment in which the sensitivity in the on-axis image height of the photoconductor drum 4 is set at low and the sensitivity in the maximum off-axis image height of the photoconductor drum 4 is set at high, ghosting is easily caused in the region of the maximum off-axis image height having high sensitivity.

A reason why ghosting caused in the region of the maximum off-axis image height having high sensitivity is bad is described with reference to FIGS. 10A to 10D. FIGS. 10A to 10D are sectional views of the photoconductor drum 4. FIGS. 10A to 10D show a process from printing of a solid black patch on the surface of the photoconductor drum 4 and recharging to arrival at the developing part. In particular, the movement of electrons and positive holes are discussed.

When the charge generation layer 4c of the photoconductor drum 4 is strongly exposed with a latent image such as a solid black patch, electrons and positive holes make pairs within the charge generation layer 4c, the positive holes pass through the charge transport layer 4d to reach the surface, and forms a latent image by cancelling the electrified charge. When the charge generation layer 4c is exposed, electrons and positive holes R called residual photo-carrier sometimes keep remaining within the charge generation layer 4c (state A). The residual photo-carrier tends to be generated easily when a film thickness of the charge generation layer 4c is large and amount of the photosensitive component is large. After the photoconductor drum 4 is charged successively, an electric field in the layer is increased; therefore, the positive holes R of the residual photo-carrier move to the surface of the photoconductor drum 4 and are cancelled (state B). The positive holes R that have moved, during charging, to the surface of the photoconductor drum 4 are cancelled as described above and give no influence to the charging potential. However, some positive holes R do not move so fast and move to the surface of the photoconductor drum 4 slowly after charging (state C). Such positive holes R moving slowly cancel the electrified charge to change the charging potential (state D). This causes ghosting.

lightness measurement is made to indicate a value of difference ΔL* between lightness value L* at the central part and lightness value L* at the end part. For the lightness value measurement, Spectrolino produced by X-Rite, Inc. is used. Specifically, a lightness value average value of five positions at the image center and five positions of lightness average values at 5 mm inner part from the edge of the image halftone part are determined. As the measurement position, a part not affected by ghosting is selected and the measurement is made. The difference ΔL* shows a difference at the central and the end part when the lightness L* at the central part is set at 0 (zero). Accordingly, when the difference ΔL* is large in the plus direction, density at the central part of the image is high. When the difference ΔL* is large in the minus direction, density at the end part of the image is high.

TABLE 3

|  | ΔV (V) | Er (%) | Photoconductor drum film thickness | Central part ghosting | End part ghosting | Uneven density ΔL* |
|---|---|---|---|---|---|---|
| Example 1 | 200 | 130 | Modulation a | Excellent/Good | Excellent/Good | −1.8 |
| Modification example 1 | 200 | 123 | Modulation a | Excellent/Good | Excellent/Good | −1.4 |
| Modification example 2 | 200 | 145 | Modulation a | Excellent/Good | Fair | −2.2 |
| Modification example 3 | 70 | 130 | Modulation a | Excellent/Good | Fair | −1.0 |
| Modification example 4 | 150 | 130 | Modulation a | Excellent/Good | Excellent/Good | −1.4 |
| Comparative example 1 | 200 | 130 | Uniform | Excellent/Good | Excellent/Good | 6.0 |
| Comparative example 2 | 0 | 130 | Modulation a | Excellent/Good | Poor | −1.4 |
| Example 2 | 200 | 130 | Modulation b | Excellent/Good | Excellent/Good | 0.2 |

Accordingly, as described in this embodiment, in the case where the charge generation layer 4c has a thickness that is large at the end part that is the maximum off-axis image height region and is small at the central part that is the on-axis image height region, ghosting is caused extremely slightly at the central part and ghosting is caused strongly at the end part. In order to reduce the phenomenon, in this embodiment, background exposure control is made in the main scanning direction after charging. This makes the image part y and the non-image part x in a state of being subjected to exposure, which enables a potential difference to be hardly generated and a density difference to be reduced.

8. Effect Confirmation

Successively, effect in this embodiment is confirmed.

Under a high-temperature and high-humidity environment of a temperature of 30° C. and a humidity of 80%, the exposure unit 400 and the photoconductor drum 4 of this embodiment are used to confirm a level of occurrence of adverse effect in an image due to ghosting. The image shown in FIG. 8A is used for the confirmation. In the image of FIG. 8A, a halftone part that has halftone between the image part and the non-image part is halftone having a density of 40% evenly on the surface. The image of FIG. 8A is suitable for determining whether a ghosting level is good or bad. The image is used to compare a ghosting level and uneven density between the photoconductor drum 4 of this embodiment and a photoconductor drum produced in the conditions as indicated in Table 1.

Table 3 shows a result of image output under the individual conditions. The ghosting level is ranked visually. As for halftone uneven density in the longitudinal direction, Table 3 has ΔV which indicates a potential difference in surface potential of the photoconductor drum 4 between pre-exposure and post-exposure in background exposure to the non-image part. Stated differently, ΔV indicates attenuation amount of charge developed on the surface of the photoconductor drum 4 by background exposure. As described earlier, Er is a ratio of exposure amount (Ec) in the proximity of the on-axis image height per unit length to exposure amount (Ee) in the proximity of the maximum off-axis image height per unit length, and Er=Ec/Ee. As for the film thickness of the photoconductor drum 4, the film thickness of the charge generation layer 4c is, in modulation a, made different between the on-axis image height and the maximum off-axis image height. In modulation b, the film thickness of the charge generation layer 4c and the film thickness of the charge transport layer 4d are made different between the on-axis image height and the maximum off-axis image height. The modulation b is detailed later in example 2. The film thickness of the charge generation layer 4c and the film thickness of the charge transport layer 4d are made uniform in the longitudinal direction of the photoconductor drum 4. As for ghosting level, a level at which no ghosting occurs is indicated by "Excellent/Good", a level at which a difference in surface potential of the photoconductor drum 4 is observed, however is invisible is indicated by "Fair", and a level at which ghosting is visible is indicated by "Poor". As a matter of course, in one embodiment, a value of ΔL*, which is an indicator of uneven density, is close to 0 (zero). In a case where the absolute value of ΔL* is equal to or smaller than 3.0, that density difference is difficult to be observed by a normal user. Thus, in this example, ΔL* having an absolute value equal to or smaller than 3.0 is determined to cause no problems.

In example 1, ghosting levels at the central part and the end part are good, and a level of uneven density ΔL* is −1.8 and good. The reason why the use of the configuration of example 1 can reduce adverse effect in an image is described by comparison with the results of comparative example 1 and comparative example 2.

Unlike example 1, in comparative example 1, the photoconductor drum 4 is a drum that has a uniform thickness of the charge generation layer 4c in the axial direction. The configuration other than the charge generation layer 4c is the same as that of example 1. Table 4 shows surface potential of the photoconductor drum 4 in each of the image height positions.

TABLE 4

| | Comparative example 1 | | | | |
|---|---|---|---|---|---|
| | Vd0 (V) | Vd (V) | V1 (V) | Vback (V) | Vcont (V) |
| On-axis image height | −560 | −360 | −100 | 120 | 140 |
| Maximum off-axis image height | −560 | −410 | −150 | 170 | 90 |

The result of image evaluation made in the same manner as in example 1 is shown in Table 3. As for ghosting, the level is good at the central part and the end part; however, a density difference ΔL* between the central part and the end part is large. This is because since the sensitivity of the photoconductor drum 4 is uniform in the longitudinal direction, and uneven light quantity of the optical system is reflected as-is, so that a latent image in the on-axis image height and a latent image in the maximum off-axis image height change largely as shown in Table 4.

In comparative example 2, no background exposure to the non-image part is performed and image output similar to that in example 1 is performed. In order to make Vd the same as that in example 1, a charging voltage is set at −830 V and the resultant Vd is −360 V in the entire region in the longitudinal direction. The laser power P2 of the image part is adjusted to be substantially equivalent to V1 in example 1. The conditions other than those are the same as those for example 1. Table 5 shows potential in each of the image height positions.

TABLE 5

| | Comparative example 2 | | | | |
|---|---|---|---|---|---|
| | Vd0 (V) | Vd (V) | V1 (V) | Vback (V) | Vcont (V) |
| On-axis image height | −360 | −360 | −100 | 120 | 140 |
| Maximum off-axis image height | −360 | −360 | −90 | 120 | 150 |

The result of image evaluation made in the same manner as in example 1 is shown in Table 3. Ghosting and uneven density at the central part are relatively good; however, the ghosting level at the image end part is bad. Since a situation where ghosting occurs in the longitudinal direction is different under conditions of comparative example 2, it was therefore found that forming a high-density image one rotation before the rotation of the photoconductor drum 4 for the halftone image as shown in FIG. 8A causes ghosting like a patch, and longitudinal density varies largely. To be specific, after one rotation of the photoconductor drum 4 that has formed a high-density image, a part having a density higher than the halftone density is formed, and longitudinal density variation is observed in the high-density part.

Figure 10:
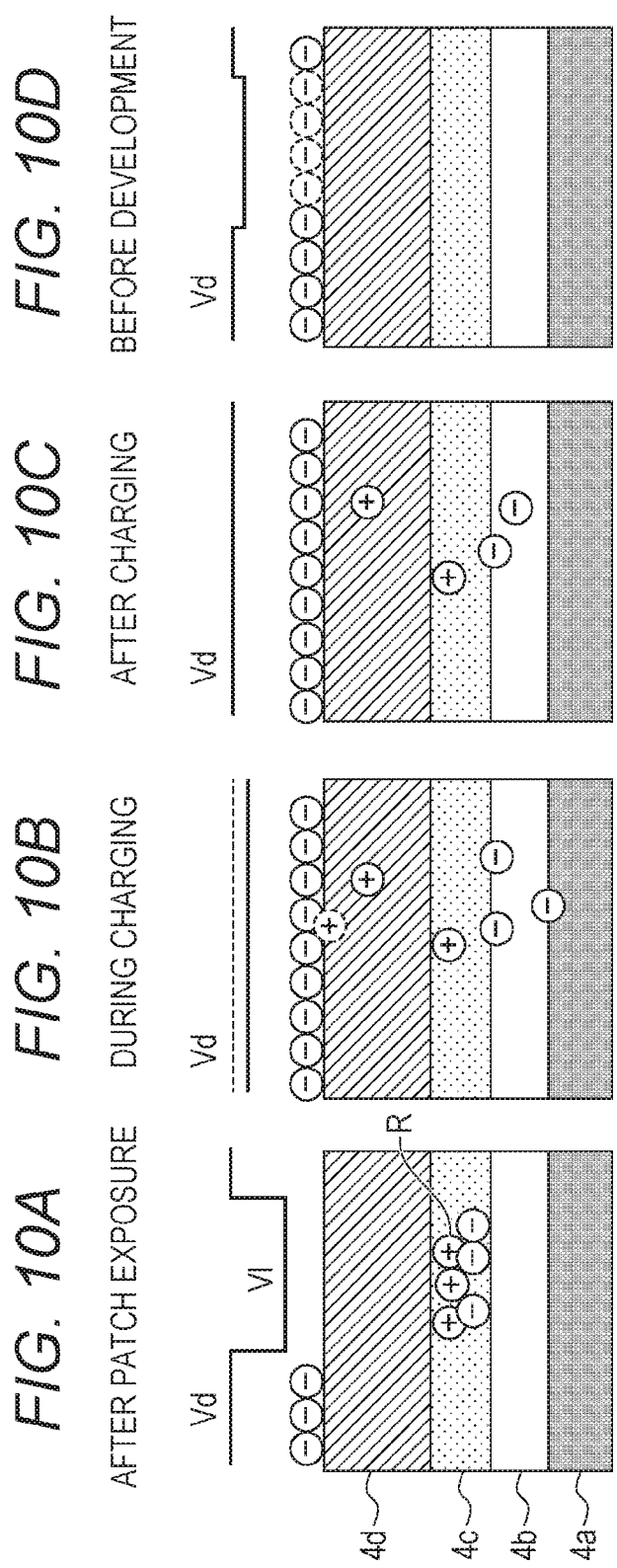
FIGS. 10A to 10D are views showing a situation in which ghosting is caused in example 1.

As is clear from the result of consideration of example 1, ghosting as described above is reduced in a case where background exposure is performed to the non-image part. The reason for the reduction is as follows: in the case of background exposure, a charging voltage having the absolute value larger than that in the case of no background exposure is applied, which forms a stronger electric field in the charge generation layer 4c and the charge transport layer 4d during charging. Thus, the residual photo-carrier can be erased during charging. In other words, the residual photo-carrier present in a state of FIG. 10C is reduced.

In contrast, in a case where no background exposure is performed as in comparative example 2, an electric field that is strong enough to remove the residual photo-carrier during charging is not formed as described above. Thus, after charging, the residual photo-carrier slowly moves to the surface of the charge transport layer 4d to cancel the surface charge, so that an unnecessary latent image is formed. In other words, the larger the potential ΔV dropping in the background exposure is, the larger the absolute value of the charging voltage is set. This increases effect of cancelling the residual photo-carrier and ghosting.

At the time of background exposure, photo-carrier generation efficiency for the case of a large residual photo-carrier is lower than photo-carrier generation efficiency for the case of a small residual photo-carrier. This leads to cancel of a latent image history of one rotation before the rotation of the photoconductor drum 4, resulting in reduction in ghosting. The larger the background exposure intensity is, namely, the larger the potential ΔV is, the larger the effect is provided. In other words, ghosting can be reduced by the following effect: (1) the absolute value of the charging voltage can be increased by background exposure to the non-image part; and (2) the residual latent image can be cancelled by background exposure. Further, it is also possible to avoid a situation in which uneven ghosting is caused in the longitudinal direction and uneven halftone density after a solid black image is caused.

In this embodiment, the laser beam 208 exposes and scans in the main scanning direction at a non-constant scan rate, and the exposure amount of the laser beam 208 reaching the surface of the photoconductor drum 4 is different. To be specific, in a configuration including the exposure unit 400 which exposes the first region of the photoconductor drum 4 at the first scan rate, and exposes the second region thereof at a second scan rate higher than the first scan rate, example 1 has the following characteristics. First exposure and second exposure are performed on the surface of the photoconductor drum 4 charged by the charging roller 2. The first exposure is performed at first exposure amount so as to develop image part potential with which a toner image is formed. The second exposure is performed at second exposure amount smaller than the first exposure amount so as to develop non-image part potential with which the toner image is not formed. The photoconductor drum 4 includes the charge generation layer 4c. The film thickness of the charge generation layer 4c in the first region of the photoconductor drum 4 in the axial direction of the photoconductor drum 4 is set to be smaller than the film thickness of the charge generation layer 4c in the second region that is a region farther away from the center of the photoconductor drum 4 than the first region. Stated differently, the sensitivity of the photosensitive layer in the first region is so set as to be smaller than the sensitivity of the photosensitive layer in the second region. The control unit 200 performs control in such a manner that a region in the surface of the photoconductor drum 4 in which the non-image part potential is developed in the image-forming period is exposed at the second exposure amount. This can reduce adverse effect in an image for the case where the photoconductor drum 4 is exposed by scanning in the main scanning direction at a non-constant scan rate.

In this embodiment, the first region is the central region that is the on-axis image height in a surface-to-be-scanned that the laser beam 208 scans, and the second region is the end part region that is the maximum off-axis image height in the surface-to-be-scanned. However, the first region and the second region are not limited thereto. In other words, in a condition in which the first region of the photoconductor drum 4 is exposed at the first scan rate and the second region is exposed at the second scan rate, provided that the laser beam 208 reaching the surface of the photoconductor drum 4 is different, the present disclosure is applicable independently of whether the first region and the second region are the central part and the end part.

Modification Example 1

In modification example 1, a distance between the deflector 405 and the surface-to-be-scanned of the photoconductor drum 4 is large as compared to the case of example 1. The distance D2 is set at 150 mm as shown in FIGS. 2A and 2B. The maximum value Dmax of a partial magnification is 23%, and Er that is a ratio of the on-axis image height light quantity to the maximum off-axis image height light quantity is as follows: Er=Ec/Ee=123%. As compared to example 1, Er is small in modification 1. Accordingly, a modulation degree of pulling speed at the time of formation of a photosensitive layer is made lower than that in example 1 to form the charge generation layer 4c. The result of Macbeth density measurement in the surface of the photoconductor drum 4 is shown in Table 1 described above.

The surface potential of the photoconductor drum 4 is set in a manner similar to example 1. The result of image evaluation made in the same manner as in example 1 is shown in Table 3. As with example 1, a good result is acquired. As for uneven density, the result is more desirable than that in example 1. The larger the value D2 is, the smaller the contribution to device downsizing is. Unless Er is at least 110% or greater, it is difficult to sufficiently downsize the device so that the device is clearly recognized as a small device as compared to the image forming apparatus including a scanner having normal fθ characteristics.

Modification Example 2

In modification example 2, a distance between the deflector 405 and the surface-to-be-scanned of the photoconductor drum 4 is shorter than that of example 1. The distance D2 is set at 102 mm as shown in FIGS. 2A and 2B. The maximum value Dmax of a partial magnification is 45%, and Er that is a ratio of the on-axis image height light quantity to the maximum off-axis image height light quantity is as follows: Er=Ec/Ee=145%. As compared to example 1, Er is large in modification 2. Accordingly, a modulation degree of pulling speed at the time of formation of a photosensitive layer is made higher than that in example 1 to form the charge generation layer 4c. The result of Macbeth density measurement in the surface of the photoconductor drum 4 is shown in Table 1 described above.

The surface potential of the photoconductor drum 4 is set in a manner similar to example 1. The result of image evaluation made in the same manner as in example 1 is shown in Table 3. Ghosting is slightly caused in the image end part, and a tendency for uneven density to be slightly larger than that in example 1 is observed.

As described in modification example 2, the smaller the value of D2 is, the smaller the image forming apparatus 1 can be made. This, however, increases the value of Er accordingly, the end part of the charge generation layer 4c is adjusted to be thicker than that in example 1, which offsets effect of resolving ghosting due to background exposure. This tends to make the ghosting level worse at the end part. However, an image where ghosting is visible is limitative and determination is made that the case of modification 2 can withstand practical use.

As for uneven density, when the film thickness of the charge generation layer 4c is so modulated that Vd is made uniform in the longitudinal direction, V1 (or Vcont) is slightly different between the central part and the end part. The tendency is seen more easily in modification example 2 in which the end part of the charge generation layer 4c is made thicker than that in example 1. The reason for that is described with reference to FIG. 11.

Figure 11:
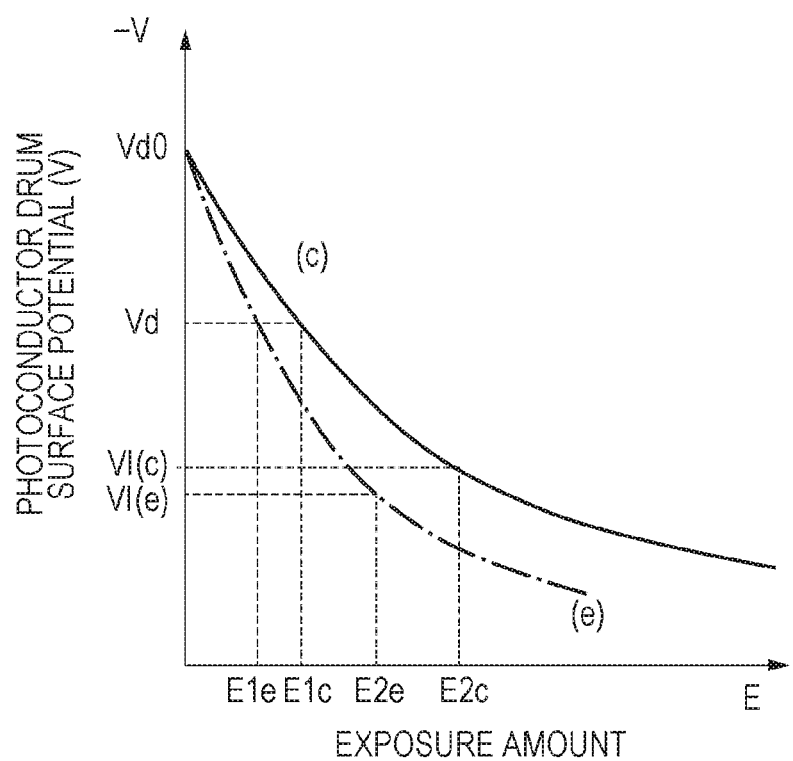
FIG. 11 is a diagram showing a relationship between example 1 and modification examples 1 to 4 in exposure amount and surface potential of a photoconductor.

FIG. 11 is a diagram showing a relationship between the exposure amount of the exposure unit 400 and the surface potential of the photoconductor drum 4. In FIG. 11, the graph shows scanning light quantity in the horizontal axis and surface potential of the photoconductor drum 4 in the vertical axis. As for the surface potential of the photoconductor drum 4 in the vertical axis, the minus direction is shown in the upper part of the drawing for easy viewing. Solid line (c) represents a potential curve of the on-axis image height (corresponding to the image center). Dot-dash-line (e) represents a potential curve of the maximum off-axis image height (corresponding to the image end part). The horizontal axis has: E1c that shows scanning light quantity in the on-axis image height at the time of background exposure; E1e that shows scanning light quantity in the maximum off-axis image height at the time of background exposure; E2c that shows scanning light quantity of the image part in the on-axis image height; and E2e that shows scanning light quantity of the image part in the maximum off-axis image height. The formula E1c/E1e=E2c/E2e=Er=145% holds. The sensitivity of the charge generation layer 4c at the on-axis image height position is relatively low. This causes the potential curve (c) to tend to have a gradient gentler than the potential curve (e) of the maximum off-axis image height. Accordingly, if Vd is made uniform independently of the image height, VI is deviated due to the image height, so that the absolute value of V1(c) in the on-axis image height is larger than the absolute value of V1(e).

As for the potential difference ΔV in the background exposure to the non-image part, the larger the potential difference ΔV is, the larger Vd0 is. This increases the deviation of V1 due to the image height as described above. In modification examples 3 and 4 below, the potential difference ΔV is small as compared to example 1, and thus the deviation of V1 due to the image height is small as compared to example 1. Consequently, uneven density ΔL* is also small as compared to example 1 as shown in Table 3.

The tendency is caused by a difference in slope between the potential curve (c) and the potential curve (e) as shown in Table 3. Accordingly, the larger the value Er, which is a condition for increasing the difference in slope, is, the more uneven density tends to be seen. A deviation of Vd probably impairs the fog partially. In this embodiment, therefore, the film thickness of the charge generation layer 4c is so adjusted that Vd is made uniform in the image height. In addition, Er is to be set so that the deviation of V1 is reduced as much as possible.

In light of the conditions in modification example 1 and modification example 2, in one embodiment, a range of Er=Ec/Ee is set as follows.

$$1.10 \leq Ec/Ee \leq 1.45 \quad \text{Formula (4)}$$

Modification Example 3

In modification example 3, a potential difference ΔV in background exposure to the non-image part is set at 70 V. In order to make post-background exposure Vd the same as that in example 1, a charging voltage to be applied to the charging roller 2 is −970 V while the charging voltage thereto is −1100 V in example 1. The surface potential of the photoconductor drum 4 is then charged to −430 V evenly by the charging roller 2. The background exposure intensity at the non-image part and the exposure intensity at the image part are so adjusted to have a value of −360 V in the on-axis image height which is the same value as that in Table 2 of example 1. The configuration of the photoconductor drum 4 is completely the same as that of example 1. Table 6 shows surface potential of the photoconductor drum 4 in modification example 3.

TABLE 6

| | Modification example 3 | | | | |
|---|---|---|---|---|---|
| | Vd0 (V) | Vd (V) | V1 (V) | Vback (V) | Vcont (V) |
| On-axis image height | −430 | −360 | −100 | 120 | 140 |
| Maximum off-axis image height | −430 | −365 | −94 | 125 | 146 |

The result of image evaluation made in the same manner as in example 1 is shown in Table 3. The value of ΔV is small as compared to example 1; therefore effect of improving ghosting is small and therefore ghosting is slightly observed in the image end part. However, an image where ghosting is visible is limitative and determination is made that the case of modification 2 can withstand practical use.

Modification Example 4

In modification example 4, a potential difference ΔV in background exposure to the non-image part is set at 150 V. In order to make post-background exposure Vd the same as that in example 1, a charging voltage to be applied to the charging roller 2 is −1050 V while the charging voltage thereto is −1100 V in example 1. The surface potential of the photoconductor drum 4 is then charged to −510 V evenly by the charging roller 2. The background exposure intensity at the non-image part and the exposure intensity at the image part are so adjusted to have a value of −360 V in the on-axis image height which is the same value as that in Table 2 of example 1. The configuration of the photoconductor drum 4 is completely the same as that of example 1. Table 7 shows surface potential of the photoconductor drum 4 in modification example 4.

TABLE 7

| | Modification example 4 | | | | |
|---|---|---|---|---|---|
| | Vd0 (V) | Vd (V) | V1 (V) | Vback (V) | Vcont (V) |
| On-axis image height | −510 | −360 | −100 | 120 | 140 |
| Maximum off-axis image height | −510 | −365 | −90 | 125 | 150 |

The result of image evaluation made in the same manner as in example 1 is shown in Table 3. The value of ΔV is small as compared to example 1; however, the value is sufficient to resolve ghosting in the end part. As described earlier, a larger value of ΔV produces large effect of reducing ghosting. However, an excessively large value of ΔV uses a larger charging voltage or a larger laser power, which further needs to take measures against charging voltage leakage or specifications of a laser element. Further, as described above, a large value of ΔV leads to a large deviation of V1 in the image height. In light of the foregoing, in one embodiment, ΔV is equal to or smaller than 350 V. Along with the result in modification example 3, a range of ΔV is as follows.

$$70 \text{ V} \leq \Delta V \leq 350 \text{ V} \quad \text{Formula (5)}$$

In another embodiment, the range of ΔV is as follows.

$$150 \text{ V} \leq \Delta V \leq 250 \text{ V} \quad \text{Formula (6)}$$

The value of ΔV is set as shown above, so that adverse effect due to charging and adverse effect due to exposure can be reduced and adverse effect in an image can be reduced effectively.

Example 2

The description goes on to another example of the present disclosure. The basic configuration and operation of an image forming apparatus of this example are the same as those of example 1. Thus, in the image forming apparatus of example 2, elements having functions or structures that are the same or correspond as/to those of the image forming apparatus in example 1 have been given the same reference signs, and detailed descriptions thereof have been omitted.

Figure 12:
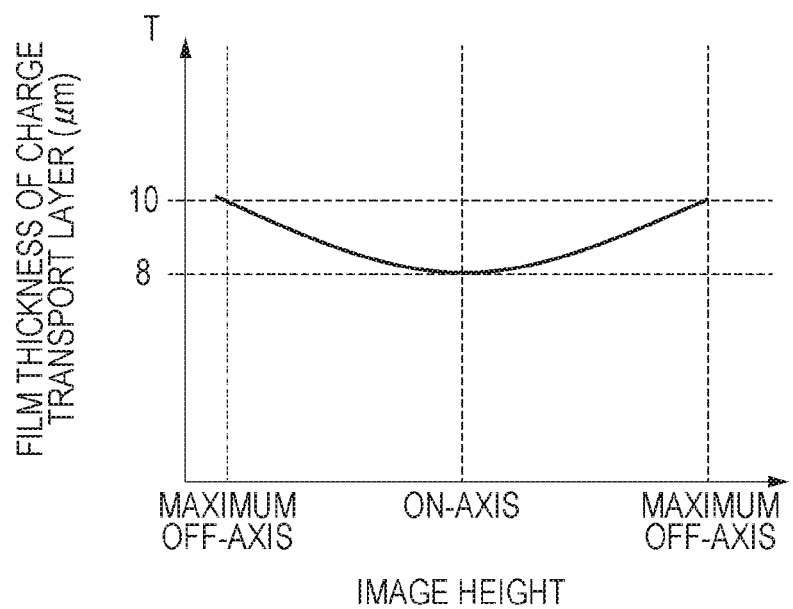
FIG. 12 is a diagram showing a relationship between an image height and a film thickness of a charge transport layer according to example 2.

In example 2, the photoconductor drum 4 is used in which the film thickness of the charge transport layer 4*d* is modulated in addition to the film thickness modulation of the charge generation layer 4*c* of example 1 (modulation b of Table 3). The film thickness of the charge transport layer 4*d* is controlled by modulating the pulling speed at the time of dip coating. The charge transport layer 4*d* is a transparent film, and cannot be measured by a densitometer unlike the charge generation layer 4*c*. The film thickness of the charge transport layer 4*d* is thus measured in eddy current method. For the measurement, Fischerscope MMS PC2 produced by Fischer Instruments K. K. is used. FIG. 12 shows a result of the film thickness measurement. In FIG. 12, the graph shows an image height position in the horizontal axis, and a film thickness T (μm) of the charge transport layer 4*d* in the vertical axis. The film thickness at the on-axis image height position is 8 μm and the film thickness at the maximum off-axis image height position is 10 μm, which have a substantially symmetrical shape. The surface Macbeth density of the photoconductor drum 4 is shown in Table 1 described earlier. As compared to example 1, the density at the on-axis image height position is slightly high and the sensitivity difference due to image height is slightly low. The other conditions are the same as those in example 1.

Figure 13:
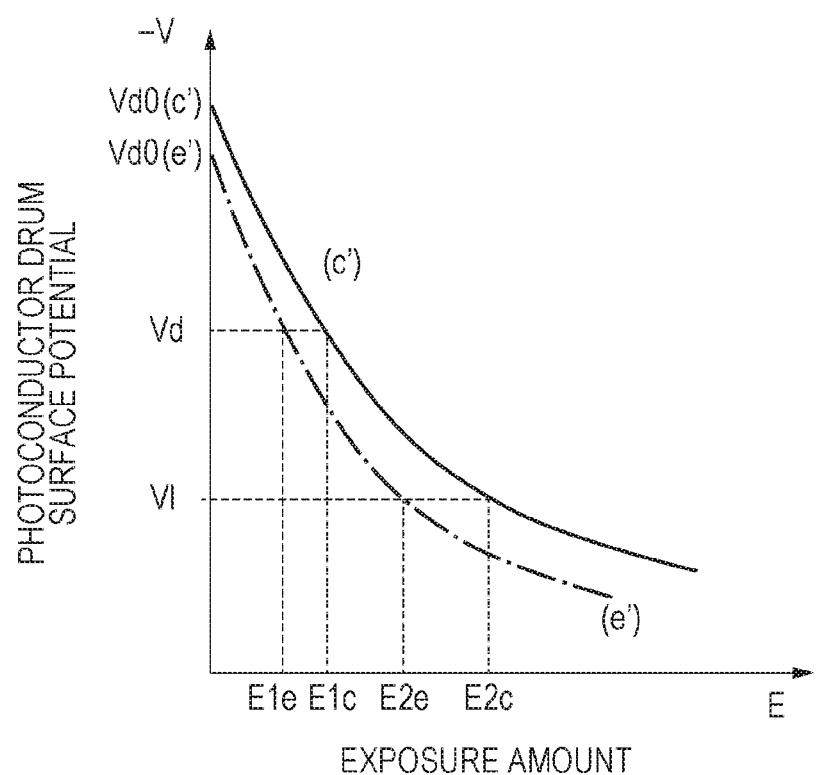
FIG. 13 is a diagram showing a relationship between exposure amount and surface potential of a photoconductor according to example 2.

FIG. 13 shows a relationship between exposure amount of the exposure unit 400 in example 2 and surface potential of the photoconductor drum 4. The film thickness of the charge transport layer 4d of the photoconductor drum 4 is smaller at the on-axis image height position than at the maximum off-axis image height position, so that the absolute value of the post-charge potential Vd0 (c') is large. Further, as compared to a potential curve c of FIG. 11 in example 1, a potential curve c' of FIG. 13 is steep. This is because Macbeth density in the on-axis image height is higher, namely, the sensitivity is higher, in example 2 than that of the photoconductor drum 4 in example 1. In potential Vd at a time when the background exposure E1 is subjected and potential V1 at a time when the image part exposure E2 is subjected, potential at the on-axis image height position is equal to potential at the maximum off-axis image height position.

Table 8 shows surface potential of the photoconductor drum 4 of example 2.

TABLE 8

| Example 2 | Vd0 (V) | Vd (V) | V1 (V) | Vback (V) | Vcont (V) |
|---|---|---|---|---|---|
| On-axis image height | −580 | −360 | −90 | 120 | 150 |
| Maximum off-axis image height | −560 | −360 | −90 | 120 | 150 |

The result of image evaluation made in the same manner as in example 1 is shown in Table 3. As for ghosting, the level is good at the central part and the end part because 200 V of ΔV is ensured as with example 1. As for uneven density ΔL*, a further favorable result is achieved.

In a configuration including the exposure unit 400 in which the laser beam 208 exposes and scans in the main scanning direction at a non-constant scan rate, example 2 has the following characteristics. First exposure and second exposure are performed on the surface of the photoconductor drum 4 charged by the charging roller 2. The first exposure is performed at first exposure amount so as to develop image part potential with which a toner image is formed. The second exposure is performed at second exposure amount smaller than the first exposure amount so as to develop non-image part potential with which the toner image is not formed. The photosensitive layer of the photoconductor drum 4 includes the charge generation layer 4c and the charge transport layer 4d. The film thickness of the charge generation layer 4c in the first region of the photoconductor drum 4 in the axial direction of the photoconductor drum 4 is set to be smaller than the film thickness of the charge generation layer 4c in the second region, which is an outer region of the first region, in the axial direction of the photoconductor drum 4. The film thickness of a charge generation layer 4c in the first region of the photoconductor drum 4 in the axial direction of the photoconductor drum 4 is set to be smaller than the film thickness of the charge generation layer 4c in the second region, which is an outer region of the first region, in the axial direction of the photoconductor drum 4. The control unit 200 performs control in such a manner that a region in the surface of the photoconductor drum 4 in which the non-image part potential is developed in the image-forming period is exposed at the second exposure amount. This can reduce adverse effect in an image for the case where the photoconductor drum 4 is exposed by scanning in the main scanning direction at a non-constant scan rate.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-224162, filed Nov. 29, 2018, which is hereby incorporated by reference herein in its entirety.

What is claimed is:

1. An image forming apparatus comprising:
a photoconductor including a charge generation layer;
a charging member configured to charge a surface of the photoconductor; and
an exposure unit configured to perform first exposure to form a first potential so as to form an image portion on a surface of the photoconductor charged by the charging member, and second exposure with an exposure amount that is smaller than an exposure amount of the first exposure to form a second potential so as to form a non-image portion on the surface of the photoconductor charged by the charging member; and
a control unit configured to control an exposure amount of the exposure unit,
wherein the exposure unit exposes the surface of the photoconductor by scanning with a laser beam in a main scanning direction at a non-constant scan rate, and an exposure amount per unit length of the surface of the photoconductor in the main scanning direction is larger in a first region than in a second region, the first region being a region in the surface of the photoconductor exposed at a first scan rate, the second region being a region in the surface of the photoconductor exposed at a second scan rate higher than the first scan rate,
wherein a thickness of the charge generation layer is smaller in the first region than in the second region, and
wherein the control unit controls the exposure amount so that an absolute value of the first potential formed in the first region is larger than an absolute value of the first potential formed in the second region when the first region and the second region are exposed by the exposure unit at the exposure amount of the first exposure.

2. The image forming apparatus according to claim 1, wherein the first region is a region of a central part of the photoconductor in the main scanning direction, and the second region is a region of an end part of the photoconductor in the main scanning direction.

3. The image forming apparatus according to claim 1, wherein a position of the first region in the surface of the photoconductor is a position corresponding to an on-axis image height in a surface-to-be-scanned that the laser beam scans, and a position of the second region in the surface of the photoconductor is a position corresponding to a maximum off-axis image height in the surface-to-be-scanned.

4. The image forming apparatus according to claim 1, wherein the scan rate of the exposure unit in the main scanning direction is increased from the first region toward the second region, and the exposure amount per unit length of the surface of the photoconductor in the main scanning direction is reduced from the first region toward the second region, and
wherein the thickness of the charge generation layer is larger as closer to the second region from the first region.

5. The image forming apparatus according to claim 1, wherein the photoconductor includes a charge transport layer, and
wherein a thickness of the charge transport layer is larger in the second region than in the first region.

6. The image forming apparatus according to claim 5, wherein the thickness of the charge transport layer is larger as closer to the second region from the first region.

7. The image forming apparatus according to claim 5, wherein a difference in thickness between the charge transport layer in the first region and the charge transport layer in the second region is larger than 1 µm.

8. The image forming apparatus according to claim 1, wherein a formula $1.10 \leq Ec/Ee \leq 1.45$ holds where Ec ($\mu J/cm^2$) represents an exposure amount per unit length of the first region in the surface of the photoconductor in the main scanning direction, and Ee ($\mu J/cm^2$) represents an exposure amount per unit length of the second region in the surface of the photoconductor in the main scanning direction.

9. The image forming apparatus according to claim 1, wherein an attenuation amount of potential in a non-image forming part which attenuates by exposure with a second exposure amount is $70 \text{ V} \leq \Delta V \leq 350 \text{ V}$.

10. The image forming apparatus according to claim 1, wherein, in the exposure unit, light emission luminance of a light source of the laser beam is constant in the main scanning direction.

11. An image forming apparatus comprising:
a photoconductor;
a charging member configured to charge a surface of the photoconductor;
an exposure unit configured to perform first exposure to form a first potential so as to form an image portion on a surface of the photoconductor charged by the charging member, and second exposure with an exposure amount that is smaller than an exposure amount of the first exposure to form a second potential so as to from a non-image portion on the surface of the photoconductor charged by the charging member; and
a control unit configured to control an exposure amount of the exposure unit,
wherein the exposure unit exposes the surface of the photoconductor by scanning with a laser beam in a main scanning direction at a non-constant scan rate, and an exposure amount per unit length of the surface of the photoconductor in the main scanning direction is larger in a first region than in a second region, the first region being a region in the surface of the photoconductor exposed at a first scan rate, the second region being a region in the surface of the photoconductor exposed at a second scan rate higher than the first scan rate,
wherein sensitivity of the photoconductor is higher in the second region than in the first region, and
wherein the control unit controls the exposure amount so that an absolute value of the first potential formed in the first region is larger than an absolute value of the first potential formed in the second region when first region and the second region are exposed by the exposure unit at the exposure amount of the first exposure.

12. The image forming apparatus according to claim 11, wherein the scan rate of the exposure unit in the main scanning direction is increased from the first region toward the second region, and the exposure amount per unit length of the surface of the photoconductor in the main scanning direction is reduced from the first region toward the second region, and
wherein the sensitivity of the photoconductor is higher as closer to the second region from the first region.

13. The image forming apparatus according to claim 11, wherein a formula $1.10 \leq Ec/Ee \leq 1.45$ holds where Ec ($\mu J/cm^2$) represents an exposure amount per unit length of the first region in the surface of the photoconductor in the main scanning direction, and Ee ($\mu J/cm^2$) represents an exposure amount per unit length of the second region in the surface of the photoconductor in the main scanning direction.

14. The image forming apparatus according to claim 11, wherein attenuation amount of potential in a non-image forming part which attenuates by exposure with a second exposure amount is $70 \text{ V} \leq \Delta V \leq 350 \text{ V}$.

15. The image forming apparatus according to claim 11, wherein, in the exposure unit, light emission luminance of a light source of the laser beam is constant in the main scanning direction.

16. The image forming apparatus according to claim 11, wherein the photoconductor includes a charge generation layer, and
wherein a thickness of the charge generation layer is smaller in the first region than in the second region.

17. The image forming apparatus according to claim 11, wherein the first region is a region of a central part of the photoconductor in the main scanning direction, and the second region is a region of an end part of the photoconductor in the main scanning direction.

18. An image forming apparatus comprising:
a photoconductor including a charge generation layer;
a charging member configured to charge a surface of the photoconductor; and
an exposure unit configured to expose the surface of the photoconductor to form an image portion on the surface of the photoconductor charged by the charging member,
wherein the exposure unit exposes the surface of the photoconductor by scanning with a laser beam in a main scanning direction at a non-constant scan rate, and an exposure amount per unit length of the surface of the photoconductor in the main scanning direction is larger in a first region than in a second region, the first region being a region in the surface of the photoconductor exposed at a first scan rate, the second region being a region in the surface of the photoconductor exposed at a second scan rate higher than the first scan rate,
wherein a formula $1.10 \leq Ec/Ee \leq 1.45$ holds where Ec ($\mu J/cm2$) represents an exposure amount per unit length of the first region in the surface of the photoconductor in the main scanning direction, and Ee ($\mu J/cm2$) represents an exposure amount per unit length of the second region in the surface of the photoconductor in the main scanning direction, and
wherein a thickness of the charge generation layer is smaller in the first region than in the second region.

* * * * *